(12) United States Patent
Toyama

(10) Patent No.: US 6,234,207 B1
(45) Date of Patent: May 22, 2001

(54) DEVICE FOR CHANGING FLOW OF OPERATING MEDIUM IN AIR CONDITIONING SYSTEM

(75) Inventor: Isamu Toyama, Shizuoka (JP)

(73) Assignee: Fuji Injector Corporation (JP)

( * ) Notice: Subject to any disclaimer, the term of this patent is extended or adjusted under 35 U.S.C. 154(b) by 0 days.

(21) Appl. No.: 09/338,227

(22) Filed: Jun. 22, 1999

Related U.S. Application Data

(63) Continuation-in-part of application No. 09/116,506, filed on Jul. 16, 1998.

(30) Foreign Application Priority Data

| Jun. 23, 1998 | (JP) | 10-192464 |
|---|---|---|
| Apr. 28, 1999 | (JP) | 11-121241 |

(51) Int. Cl.[7] .................... E03B 31/00; F28D 5/00

(52) U.S. Cl. .......... 137/625.43; 62/305; 62/337; 62/390; 62/393; 62/434; 62/324.6

(58) Field of Search .............. 62/305, 337, 390, 62/393, 434, 324.6; 137/625.43

(56) References Cited

U.S. PATENT DOCUMENTS

| 2,519,574 | 8/1950 | Holl . | |
|---|---|---|---|
| 2,855,000 | 10/1958 | Van Allen et al. | 137/625.43 |
| 3,047,020 | 7/1962 | Barrett, Jr. . | |
| 3,796,232 | 3/1974 | Dalton . | |
| 4,290,453 | * 9/1981 | Bauer | 137/625.43 |
| 4,306,422 | * 12/1981 | Korycki | 137/625.43 |
| 4,381,798 | 5/1983 | Tobin et al. . | |
| 4,469,134 | * 9/1984 | Kanai et al. | 137/625.43 |
| 4,526,202 | 7/1985 | Chorkey . | |
| 4,805,666 | * 2/1989 | Araki et al. | 137/625.43 |
| 4,825,908 | 5/1989 | Tsuchihashi et al. . | |
| 5,188,151 | 2/1993 | Young et al. . | |
| 5,251,670 | 10/1993 | Bates . | |
| 5,462,085 | * 10/1995 | Iwata et al. | 137/625.43 |
| 5,507,315 | * 4/1996 | Parker | 137/625.43 |
| 5,547,344 | * 8/1996 | Sugiyama et al. | 417/32 |
| 5,755,111 | 5/1998 | Toyama . | |
| 5,787,930 | 8/1998 | Toyama . | |

FOREIGN PATENT DOCUMENTS

| 0 625-659 A1 | 11/1994 | (EP) . |
|---|---|---|
| 2 012 935 | 8/1979 | (GB) . |
| 61-6468 | 1/1986 | (JP) . |
| 08-128553 | 5/1996 | (JP) . |
| 09-264438 | 10/1997 | (JP) . |
| 10-73342 | 3/1998 | (JP) . |
| 10-73343 | 3/1998 | (JP) . |

(List continued on next page.)

*Primary Examiner*—William Doerrler
*Assistant Examiner*—Mark Shulman
(74) *Attorney, Agent, or Firm*—Lerner, David, Littenberg, Krumholz & Mentlik, LLP

(57) ABSTRACT

A device for changing the flow of an operating medium in an air conditioning system, comprises a casing including a first port connected to an outlet or inlet port of a compressor, a second port connected to an indoor heat exchanger, a third port connected to an outdoor heat exchanger, and a fourth port connected to the outlet or inlet port of the compressor, a drive mechanism arranged in the casing, and a valve body rotatably supported by the drive mechanism and including a first flow passageway extending between a first selectively positionable opening and a second selectively positionable opening and a second flow passageway extending between the first selectively positionable opening and a third selectively positionable opening. The valve body is reversibly rotated to a predetermined angle to allow the operating medium to selectively flow through the first flow passageway or through the second flow passageway. The second and third selectively positionable openings are located diametrically opposite each other with respect to the first selectively positionable opening.

21 Claims, 29 Drawing Sheets

FOREIGN PATENT DOCUMENTS

| | | |
|---|---|---|
| 10-089807 | 4/1998 | (JP) . |
| 10-160289 | 6/1998 | (JP) . |
| 10-205923 | 8/1998 | (JP) . |
| 10-246537 | 9/1998 | (JP) . |
| 10-29257 | 11/1998 | (JP) . |
| 10-300278 | 11/1998 | (JP) . |
| 11-006573 | 1/1999 | (JP) . |
| 11-287535 | 10/1999 | (JP) . |

* cited by examiner

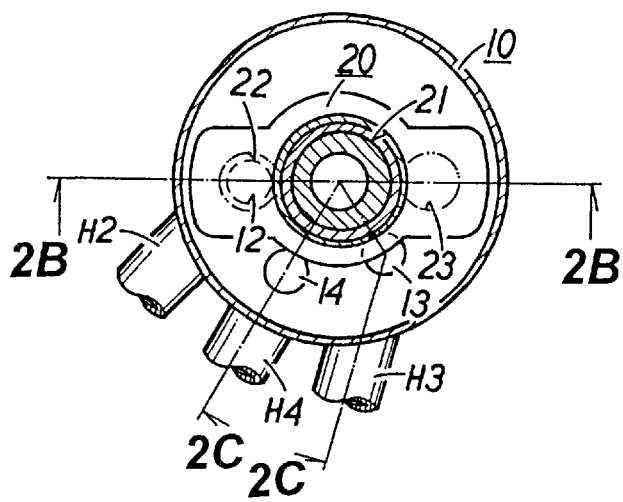
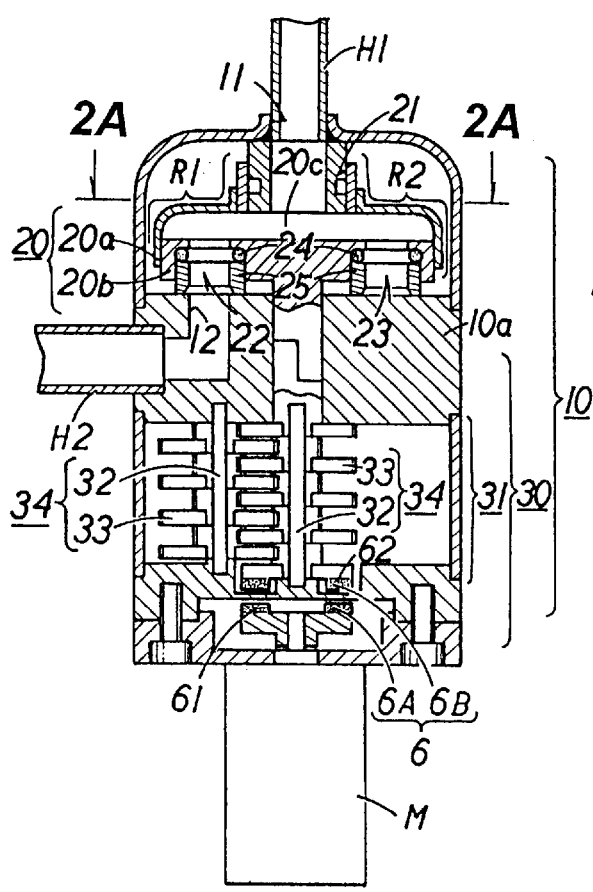
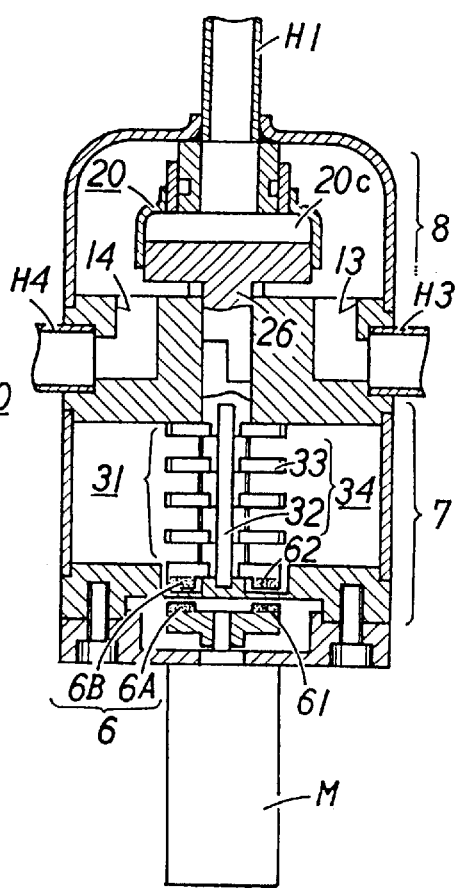

ANGLE OF ROTATION
(DEGREE)

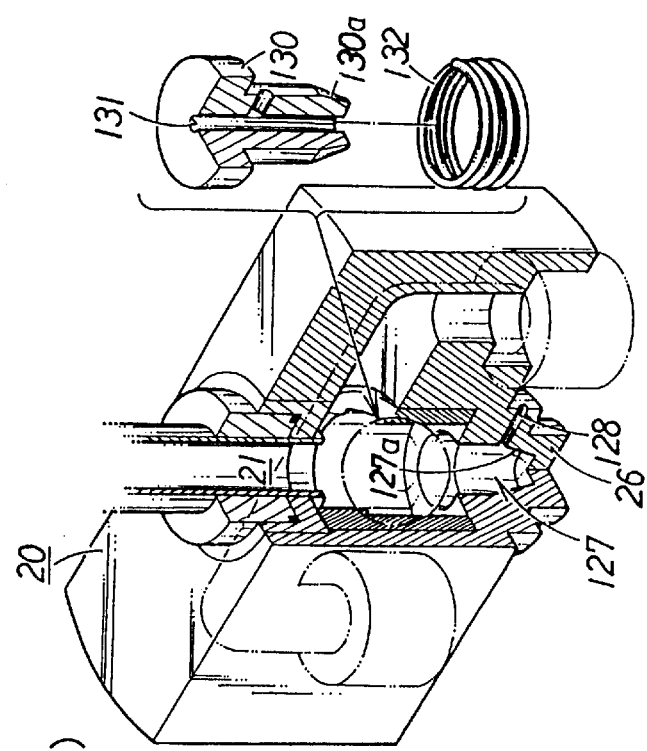
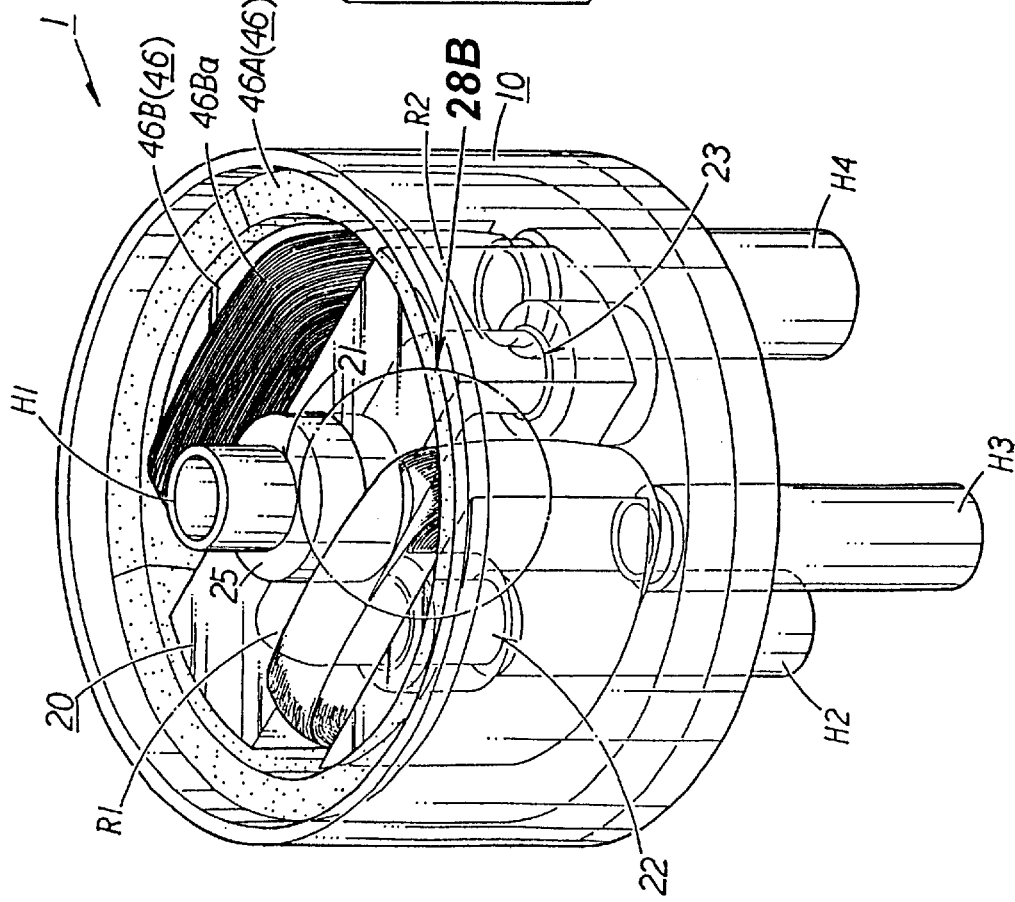
FIG. 28A
FIG. 28B

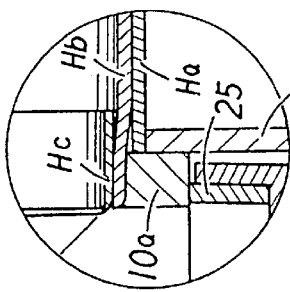
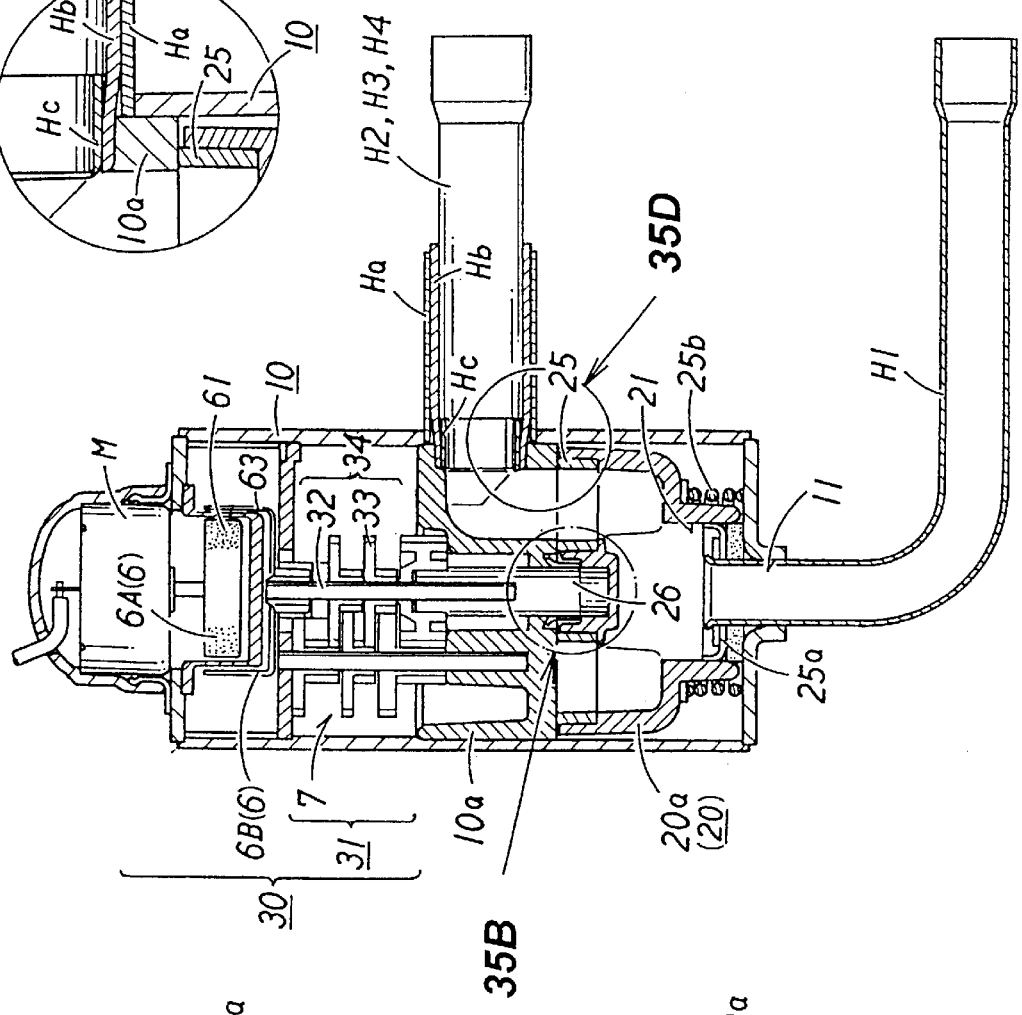
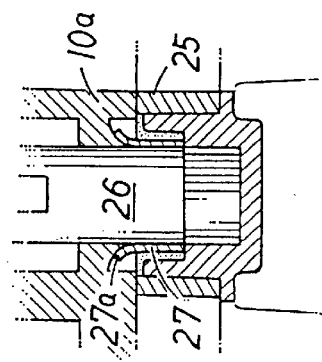
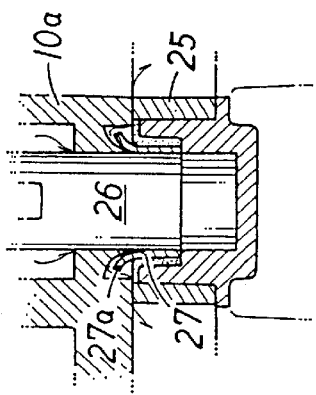

DEVICE FOR CHANGING FLOW OF OPERATING MEDIUM IN AIR CONDITIONING SYSTEM

RELATED APPLICATIONS

This is a continuation-in-part application of U.S. patent application Ser. No. 09/116,506, filed Jul. 16, 1998.

BACKGROUND OF THE INVENTION

The present invention relates to a device for changing the flow of an operating medium in a heat pump air conditioning system, designed to change the mode of operation. More particularly, the present invention is directed to a novel flow directional control device which includes an improved drive mechanism for a valve body, which utilizes differential pressure resulting from the difference between effective pressure bearing areas, which improves sealing integrity of the entire casing, and which includes a seal configured to follow movement of the valve body so as to more effectively seal the casing against leakage of the operating medium.

A typical air conditioning system includes indoor and outdoor heat exchangers between which an operating medium (as a gas under low or high pressure flowing through the indoor heat exchanger, a compressor and the outdoor heat exchanger and as a liquid flowing through the outdoor heat exchanger, a capillary tube and the indoor heat exchanger) is circulated to discharge indoor heat to the outside of a room or introduce outdoor heat into the inside of the room so as to adjust the temperature in the room. The operating medium is reversed to provide cooling or heating mode of operation. A reversing valve or four-way valve is required to reverse the flow of the operating medium since practically, the compressor is not effective.

A conventional reversing valve includes a valve body slidably moved to provide cooling or heating mode of operation, as disclosed in Japanese laid-open patent publication No. 61-6468. It is, however, difficult to maintain such a sliding valve body in close contact with a sliding surface. Also, the valve body can not smoothly be moved on the sliding surface as resistance to sliding movement increases. This makes it difficult to change the mode of operation. Undesirable friction is also developed when the sliding valve body is repeatedly slid under high pressure. Such friction deteriorates sealability. The sliding valve body requires the use of selected materials and complicated machining techniques since there is a limitation on its structure. Furthermore, the prior art valve is complicated in structure, requires a larger number of parts and assembly steps and is costly.

The inventor addresses the problems of the prior art four-way valve and has made extensive searches in an effort to provide a novel four-way valve with enhanced sealing integrity.

It is a first object of the present invention to provide a novel drive mechanism for a valve body, designed to overcome various problems associated with the prior art sliding four-way valve.

It is a second object of the present invention to provide means for making a sealing element function in an efficient manner.

It is a third object of the present invention to improve sealing integrity of a casing wherein a through hole is formed to receive a drive member, typically located outside of the casing within which a valve body is contained.

It is a fourth object of the present invention to avoid a loss of sealing integrity which may occur when a clearance is formed between a first port and a first selectively positionable opening as a result of movement of a valve body.

The prevent invention is intended to achieve the foregoing objects and provides a novel device for changing the flow of an operating medium, which includes a drive mechanism for a rotary type valve body, which utilizes differential pressure resulting from the difference between effective pressure bearing areas, which seals the entire casing against leakage, and which includes a sealing element configured to follow movement of the valve body.

SUMMARY OF THE INVENTION

According to a first aspect of the present invention, there is provided a device for changing the flow of an operating medium in an air conditioning system, which comprises a casing including a first port adapted to be connected to an outlet or inlet port of a compressor, a second port adapted to be connected to an indoor heat exchanger, a third port adapted to be connected to an outdoor heat exchanger, and a fourth port adapted to be connected to the inlet or outlet port of the compressor, a drive mechanism arranged in the casing and located on the axis of the first port, and a valve body rotatably supported by the drive mechanism and including a first flow passageway extending between a first selectively positionable opening and a second selectively positionable opening and a second flow passageway extending between the first selectively positionable opening and a third selectively positionable opening. The first port and the first selectively positionable opening is constantly kept in communication with one another. The valve body is reversibly rotated to a predetermined angle so as to selectively provide communication between the second port and the second selectively positionable opening and between the third port and the third selectively positionable opening to allow the operating medium to flow through the first flow passageway when the second port and the second selectively positionable opening are communicated with one another and to flow through the second flow passageway when the third port and the third selectively positionable opening are communicated with one another. This arrangement enables the interior of the casing to be constantly under low or high pressure and allows a balanced pressure to be exerted on the entire circumference of the valve body so as to smoothly rotate the valve body.

The second selectively positionable opening and the third selectively positionable opening are located at opposite sides of the first selectively positionable opening and arranged in a diametrically opposed relationship. This arrangement minimizes the difference between upward pressure and downward pressure developed along the axis of the first selectively positionable opening, avoids application of offset load to the valve body, and effectively eliminates a loss of sealing integrity which may occur when the valve body is inclined.

According to a second aspect of the present invention, there is provided a device for changing the flow of an operating medium in an air conditioning system, which comprises a casing including a first port adapted to be connected to an outlet or inlet port of a compressor, a second port adapted to be connected to an indoor heat exchanger, a third port adapted to be connected to an outdoor heat exchanger, and a fourth port adapted to be connected to the inlet or outlet port of the compressor, a drive mechanism arranged in the casing and located on the axis of the first port, a valve body rotatably supported by the drive mechanism and including a first flow passageway extending between a first selectively positionable opening and a second selectively positionable opening and a second flow passageway extending between the first selectively positionable opening and a third selectively positionable opening, the first port and the first selectively positionable opening being constantly kept in communication with one another, the valve body being reversibly rotated to a predetermined angle so as to selectively provide communication between the second port and the second selectively positionable opening and between the third port and the third selectively positionable opening to allow the operating medium to flow through the first flow passageway when the second port and the second selectively positionable opening are communicated with one another and to flow through the second flow passageway when the third port and the third selectively positionable opening are communicated with one another, sealing elements disposed between the second port and the second selectively positionable opening and between the third port and the third selectively positionable opening, respectively, the sealing elements each having a given shape and structure, and a first effective pressure bearing area on which pressure is applied by the operating medium flowing through the first selectively positionable opening, and a second effective pressure bearing area on which pressure is applied by the operating medium flowing through the second selectively positionable opening and the third selectively positionable opening, the first effective pressure bearing area being set to be greater than the second effective pressure bearing area, whereby differential pressure resulting from a difference between the first pressure bearing area and the second effective pressure bearing area maintains sealing integrity of the sealing elements.

This arrangement eliminates the need for any means for urging the valve body against a partition. Differential pressure resulting from the difference between the effective pressure bearing areas urges the valve body and thus, the sealing elements against the partition so as to maintain a tight seal between the second selectively positionable opening and the second port and between the third selectively positionable opening and the third port. This arrangement makes the device simple in structure and highly reliable.

According to a third aspect of the present invention, there is provided a device for changing the flow of an operating medium in an air conditioning system, which comprises a casing including a first port adapted to be connected to an outlet or inlet port of a compressor, a second port adapted to be connected to an indoor heat exchanger, a third port adapted to be connected to an outdoor heat exchanger, and a fourth port adapted to be connected to the inlet or outlet port of the compressor, a drive mechanism arranged in the casing and located on the axis of the first port, and a valve body rotatably supported by the drive mechanism and including a first flow passageway extending between a first selectively positionable opening and a second selectively positionable opening and a second flow passageway extending between the first selectively positionable opening and a third selectively positionable opening. The first port and the first selectively positionable opening are constantly kept in communication with one another. The valve body is reversibly rotated to a predetermined angle so as to selectively provide communication between the second port and the second selectively positionable opening and between the third port and the third selectively positionable opening to allow the operating medium to flow through the first flow passageway when the second port and the second selectively positionable opening are communicated with one another and to flow through the second flow passageway when the third port and the third selectively positionable opening are communicated with one another. The drive mechanism includes a transmission mechanism having a drive element and a driven element which are kept out of contact with one another during transmission of rotary power from a drive source. The driven element is sealedly received in the casing. The drive element and the drive source are interconnected and placed outside of a sealed part of the casing. This arrangement makes the valve body relatively simple in structure, improves sealing integrity of the valve body, and prevents leakage of the operating medium from around a rotary shaft to thereby enhance heat exchange.

Preferably, a bellows seal may be disposed between the first port and the first selectively positionable opening. The bellows seal is deformable so as to follow movement of the valve body and thus, maintain the sealing integrity even if a clearance is formed between the first port and the first selectively positionable opening when the valve body is inclined. The bellows seal may preferably be shaped like an inverted cup. This arrangement accommodates a change in the internal pressure within the casing and enhances the sealing integrity in proportion to an increase in the pressure.

BRIEF DESCRIPTION OF THE DRAWINGS

FIG. 2A is a sectional view taken on the line 2A—2A in FIG. 2B;

FIG. 2B is a sectional view taken on the line 2B—2B in FIG. 2A;

FIG. 2C is a sectional view taken on the line 2C—2C in FIG. 2A;

FIG. 28A is a perspective view of a fifth embodiment;

FIG. 28B is a perspective view, on an enlarged scale, of a portion 28B of the fifth embodiment as encircled in FIG. 28A;

FIG. 35A is a vertical sectional view showing a seventh embodiment of the present invention;

FIG. 35B is an enlarged view of a portion 35B of the device encircled in FIG. 35A during heating and cooling/dehumidifying operations;

FIG. 35C is a view similar to FIG. 35B but during an evacuation operation; and

FIG. 35D is an enlarged view showing a portion 35D of the device encircled in FIG. 35A.

DETAILED DESCRIPTION OF THE INVENTION

A device for changing the flow of an operating medium in an air conditioning system according to the present invention will now be described by way of example with reference to the drawings. In the following description, a first embodiment shows the basic structure of the device which is closely related to the first object of the present invention, the structure of a sealed casing intended to achieve the third object of the present invention, and the structure of a sealing element configured to follow movement of a valve body and intended to achieve the fourth object of the present invention.

A second embodiment shows a drive mechanism for a rotary valve body intended to achieve the first object of the present invention, a flow passage arrangement by which the interior of the casing is constantly under low or high pressure, and a positional relationship between second and third selectively positionable openings and a first selectively positionable opening. A third embodiment is intended to achieve the second object of the present invention and shows the use of differential pressure resulting from a difference between effective pressure bearing areas as well as the use of a supplemental spring. Fourth to seventh embodiments are directed to other details of the device and modifications.

FIRST EMBODIMENT

Figure 1B:
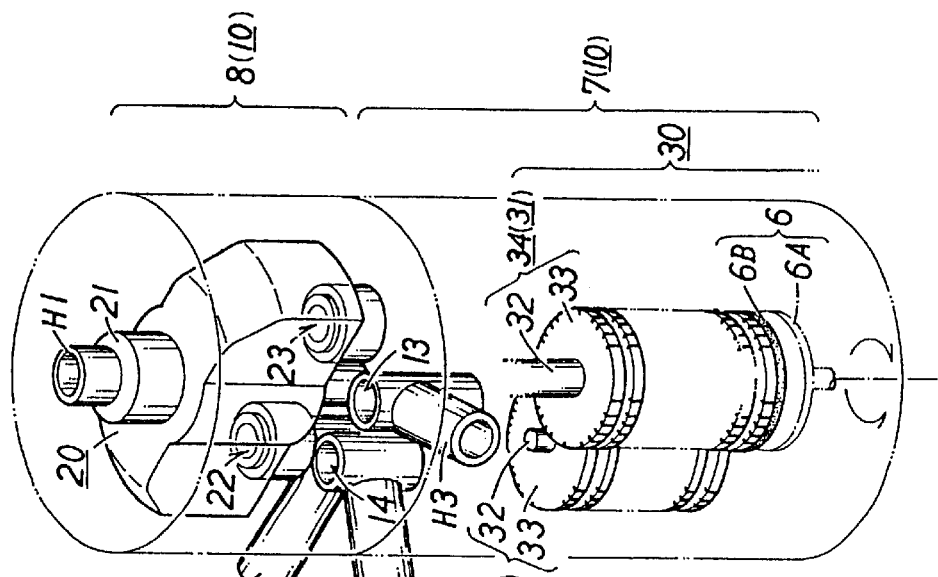
FIG. 1B is a perspective view of the device shown in FIG. 1A.
Figure 1A:
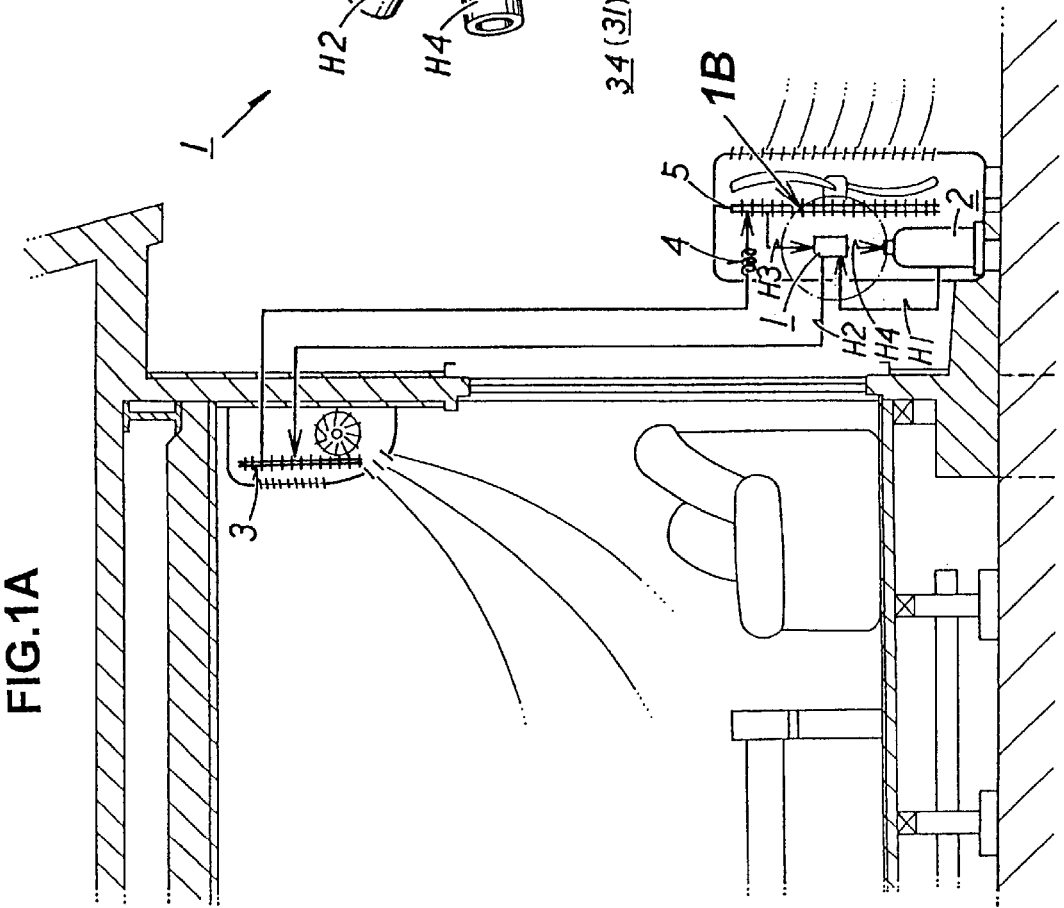
FIG. 1A illustrates operative conditions of a device for changing the flow of an operating medium in an air conditioning system, assembled according to a first embodiment of the present invention.

Referring to FIGS. 1A to 2C, there is illustrated a device 1 for changing the flow of an operating medium in an air conditioning system. The device 1 generally includes a casing 10, and a partition 10a by which the interior of the casing 10 is divided into a lower or speed reduction chamber 7 and an upper or reversing valve chamber 8, and a valve body 20 disposed within the reversing valve chamber 8 and reversibly rotated to a predetermined angle by a drive mechanism 30. The drive mechanism 30 generally includes a drive source or motor M and a speed reduction mechanism 31 disposed within the speed reduction chamber 7 and acts to change the direction of rotation of the valve body 20. In FIGS. 1A and 1B, the device 1 is in the heating mode of operation.

Figure 3:
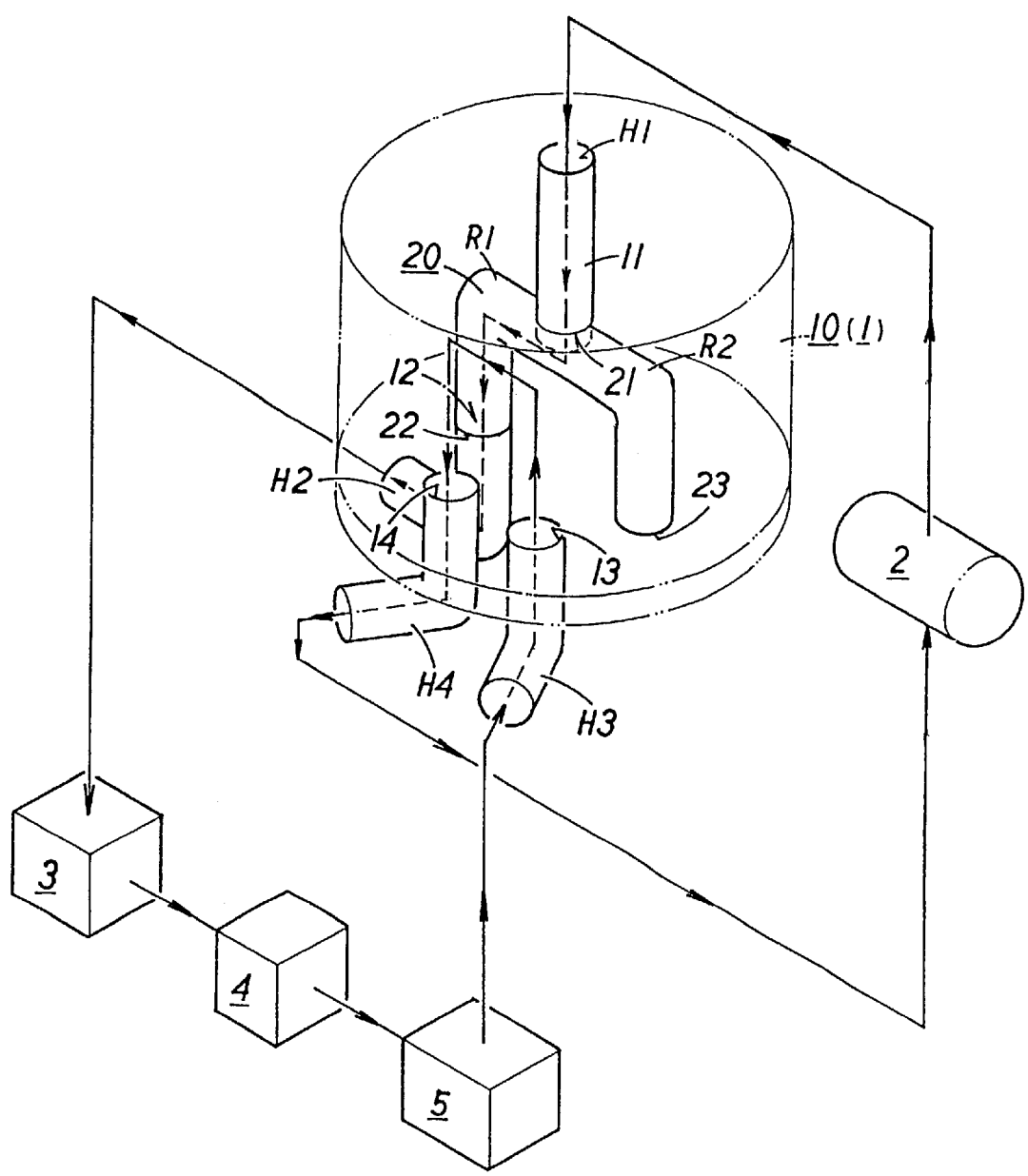
FIG. 3 illustrates the flow of an operating medium in a heating mode of operation.
Figure 4:
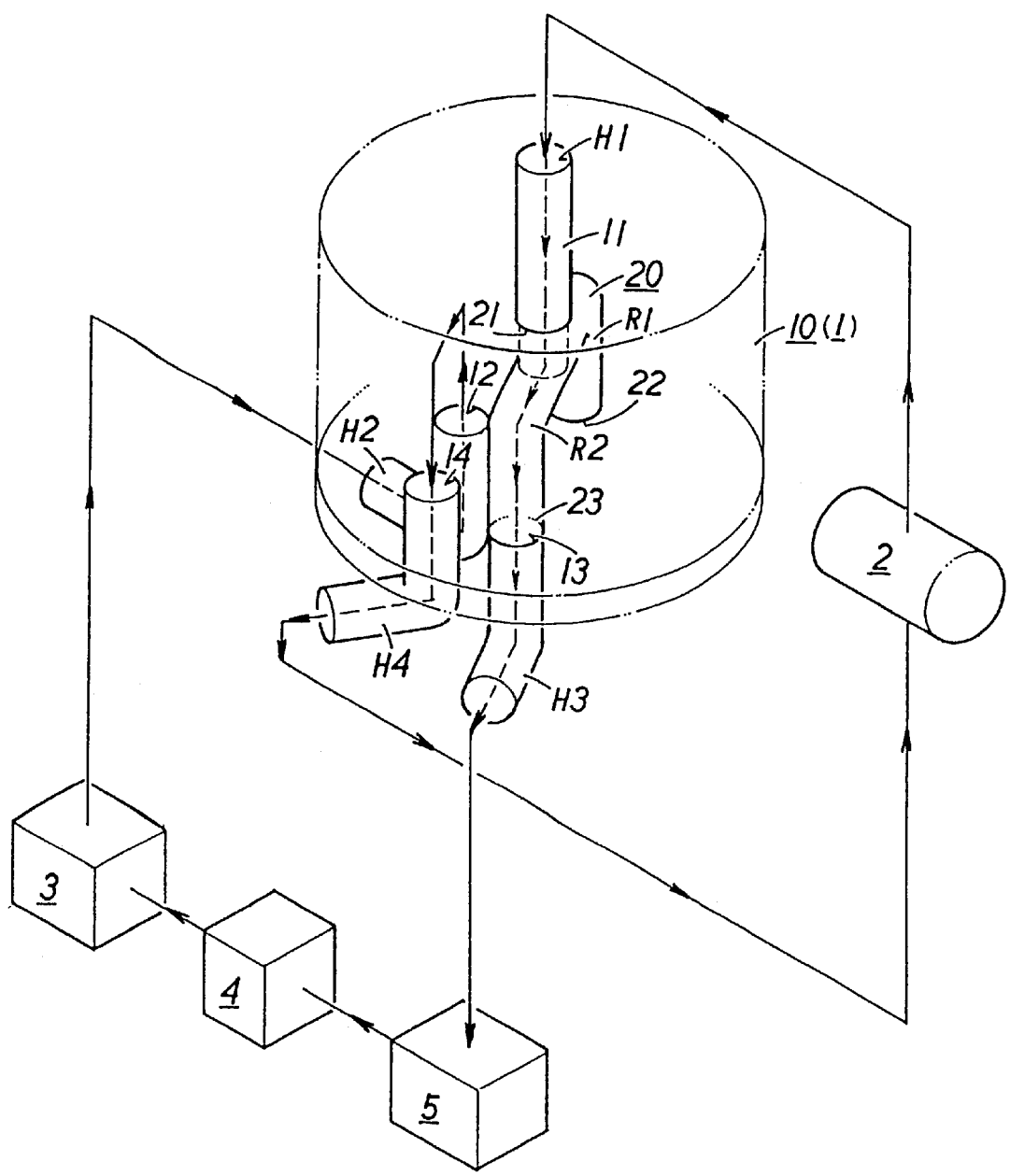
FIG. 4 illustrates the flow of an operating medium in a cooling/dehumidifying mode of operation.

The device 1 serves as part of an air conditioning system as shown in FIG. 1A. A first pipe H1 and a fourth pipe H4 both extend from the outlet or inlet port of a compressor 2 to the device 1. A second pipe H2 and a third pipe H3 both extend from the device 1 to either an indoor heat exchanger 3 or an outdoor heat exchanger 5. Illustratively, a capillary tube 4 extends between the indoor heat exchanger 3 and the outdoor heat exchanger 5 so as to reduce the pressure of an operating medium. In a heating mode of operation, the operating medium flows from the compressor 2, is passed through the device 1, the indoor heat exchanger 3, the capillary tube 4, the outdoor heat exchanger 5 and the device 1, and flows back to the compressor 2, as shown in FIGS. 1A, 3, 5A and 5B. In a cooling mode of operation, the operating medium flows from the compressor 2, is passed through the device 1, the outdoor heat exchanger 5, the capillary tube 4, the indoor heat exchanger 3 and the device 1, and flows back to the compressor 2, as shown in FIGS. 4, 6A and 6B.

Various components of the device 1 will now be described in more detail.

First, the casing 10 is generally cylindrical in shape, as shown in FIGS. 2A to 2C. The interior of the casing 10 is maintained in an air-tight manner. The speed reduction chamber 7 and the reversing valve chamber 8 are defined in the lower and upper portions of the casing 10, respectively by the partition 10a. The casing 10 is integrally formed as a single unit. To this end, casing halves are welded, bolted, threaded or otherwise secured to the partition 10a. A first port 11 is formed centrally in the top of the casing 10 to receive one end of the first pipe H1. The other end of the first pipe H1 is connected to the outlet or inlet port of the compressor 2. Illustratively, a second port 12, a third port 13 and a fourth port 14 are formed in the partition 10a. Alternatively, the fourth port 15 may be formed in the top or side wall of the casing 10. As shown in FIGS. 3 and 4, the second port 12 and the indoor heat exchanger 3 are interconnected, for example, by the second pipe H2. Similarly, the third port 13 and the outdoor heat exchanger 5 are interconnected, for example, by the third pipe H3. The fourth port 14 and the outlet or inlet port of the compressor 2 are interconnected by the fourth pipe H4. Extending centrally through the partition 10a is a rotary shaft 26 of the valve body 20 which will be described later. By this arrangement, the casing 10 is connected to the outlet and inlet ports of the compressor 2 to allow the interior of the device 1 to have, for example, a low pressure.

Reference will next be made to the valve body 20 disposed within the reversing valve chamber 8. As shown in FIGS. 1B and 2A to 2C, the valve body 20 has a generally parallelepiped shape with arcuate lateral sides. The valve body 20 includes a valve housing 20a with an open bottom, a closure plate 20b placed to close the open bottom of the valve housing 20a, and a valve chamber 20c defined within the valve housing 20a. The interior of the valve chamber 20c is kept in an air-tight manner. A first selectively positionable opening 21 is formed centrally in the top of the valve body 20. A second selectively positionable opening 22 and a third selectively positionable opening 23 are formed in bottom of the valve body 20 in a diametrically opposed relationship. A first flow passageway R1 extends between the first selectively positionable opening 21 and the second selectively positionable opening 22. A second flow passageway R2 extends between the first selectively positionable opening 21 and the third selectively positionable opening 23. One end of the first pipe H1 is inserted into the first selectively positionable opening 21. The rotary shaft 26 is fixed centrally to the bottom of the valve body 20. The rotary shaft 26 is rotatably fit into the partition 10a of the casing 10. The rotary shaft 26 and the first pipe H1 cooperate to hold the valve body 20 so that the valve body 20 may be rotated to a predetermined angle. A cylindrical sealing element 25 is fit into each of the second selectively positionable opening 22 and the third selectively positionable opening 23 through an O-ring 24. The sealing element 25 may be coated with or made of fluoroplastic. The outer end of the sealing element 25 projects slightly downwardly from the bottom of the valve body 20. With this arrangement, the sealing element 25 is resiliently urged against the upper surface of the partition 10a under the influence of the O-ring 25 so as to prevent leakage of the operating medium from the open end of the valve body 20. Illustratively, the valve housing 20a and the closure plate 20b of the valve body 20 are made from a metallic material by the use of a press. Alternatively, the valve hosing 20a and the closure plate 20b may be made of a nonmetallic material, such as glass, plastic, or the like.

Reference will be made to the speed reduction mechanism 31 disposed within the speed reduction chamber 7. The speed reduction mechanism 31 is intended to reduce the rotational speed of power transmission from the motor M as a drive source to the rotary shaft 26 of the valve body 20. As shown in FIGS. 2A to 2C, the speed reduction mechanism 31 includes a gear train 34 wherein a plurality of gears 33 with different gear ratios are mounted to shafts 32 and arranged one above the other. The gears 33 are operatively associated with one another to sequentially reduce the speed of power transmission until a suitable rate of speed reduction is achieved. One of the shafts 32 is connected at its one end to the rotary shaft 26 so as to rotate the valve body 20 by a given angle. One of the gears 33 which is placed to first receive rotary power from the motor M is provided with the driven element of a transmission mechanism 6 which will be described hereinbelow.

The transmission mechanism 6 includes a drive element 6A directly driven for rotation by the motor M, and a driven element 6B rotated with the drive element 6A, but kept out of contact with the drive element 6A. Illustratively, the drive element 6A and the driven element 6B are in the form of permanent magnets 61, 62, respectively. The permanent magnet 62 is attached to a bottom surface of one of the gears 33 which is placed to first receive rotary power from the motor M. The other permanent magnet 61 is attached to the output shaft of the motor M which is placed below the speed reduction chamber 7. As the motor M is energized, the permanent magnet 61 is driven to rotate the permanent magnet 62 which is kept out of contact with the permanent magnet 61. This rotary power is transmitted through the gear train 34 and the rotary shaft 26 so as to angularly move the valve body 20 in selected directions. There is no need to hermetically seal a container within which the permanent magnet 61 is received. Illustratively, the permanent magnet 61 is attached to a bracket by which the motor M is fixedly mounted. The driven element 6B substantially acts as a means for directly driving the valve body 20 and is placed within the sealed casing 10. This arrangement enables efficient heat exchange since if an operating medium leaks, for example, from around the rotary shaft 26, such an operating medium will in now way flow out of the speed reduction chamber 7. The direction of rotation of the valve body 20 can be reversed by changing the direction of flow of an electrical current to the motor M.

Where the speed reduction mechanism 31 is designed to have a reduction ratio of, for example, 1/800, the valve body 20 is rotated by 45 degrees when the drive element 6A is rotated one hundred times.

Figure 7:
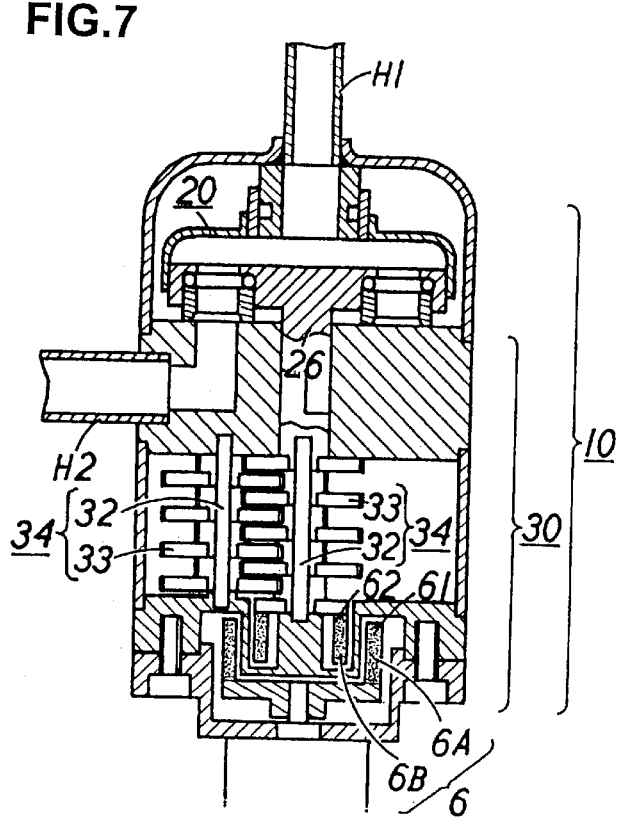
FIG. 7 is a vertical sectional view of the device wherein a transmission mechanism has substantially vertically oriented surfaces between which rotary power is transmitted.
Figure 8:
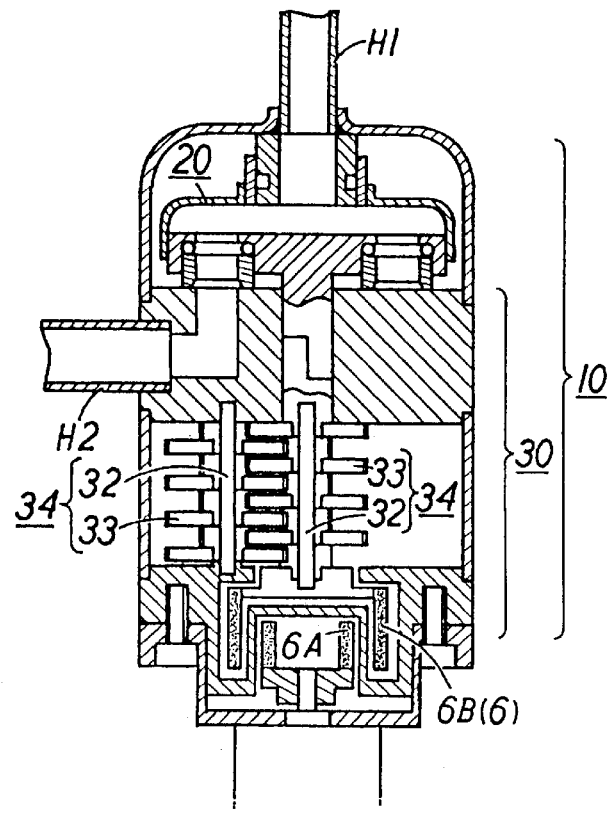
FIG. 8 is a view similar to that of FIG. 7, but showing that a driven element is placed around a drive element.

In this embodiment, the permanent magnets 61, 62 have substantially horizontally oriented surfaces between which rotary power is transmitted. As shown in FIG. 7, the permanent magnets 61, 62 may have substantially vertically oriented surfaces if it is necessary to enhance power transmission, or if there is a limitation on the space in which the device is installed. The drive element 6A is placed around the driven element 6B with the permanent magnets 61, 62 attached to their confronting surfaces. Alternatively, the driven element 6B may be placed around the drive element 6A as shown in FIG. 8.

Figure 9:
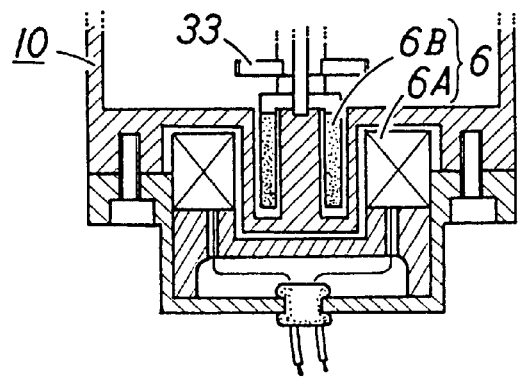
FIG. 9 illustrates that the drive element is in the form of a coil and serves as a stator.

Still alternatively, the drive element 6A may be in the form of a coil as shown in FIG. 9 as if it serves as a stator for the motor.

Preferably, stoppers are provided to stop movement of the valve body 20 when the valve body 20 is rotated to the predetermined angle to thereby provide connection between the second selectively positionable opening 22 and the second pipe H2 and between the third selectively positionable opening 23 and the third pipe H3.

The mode of operation of the device is as follows. Reference will be made separately to a heating mode and a cooling/dehumidifying mode.

(1) Heating Mode

Figure 5A:
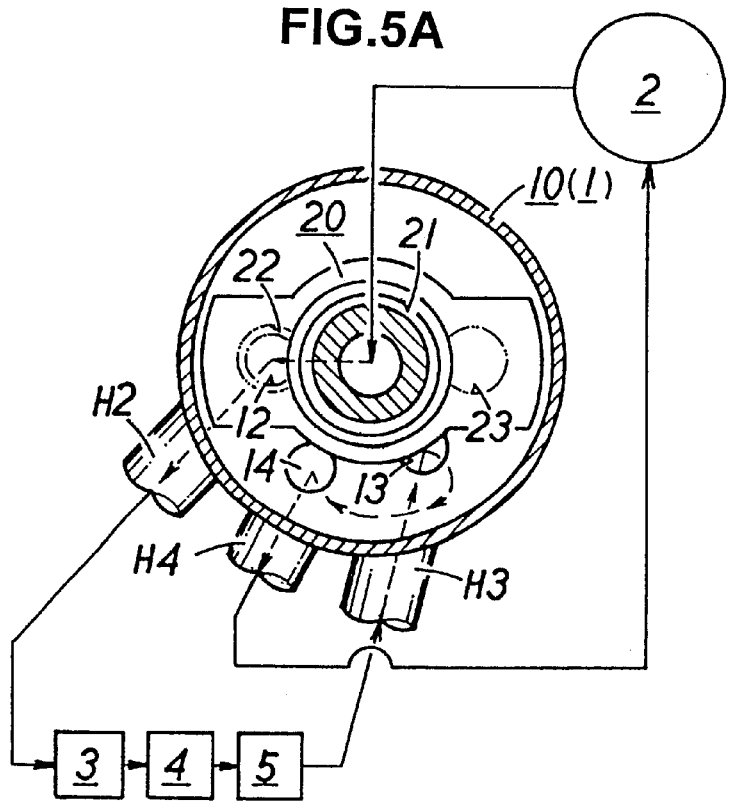
FIGS. 5A and 5B are horizontal and vertical sectional views, respectively, of the device, showing the flow of the operating medium in the heating mode of operation.
Figure 5B:
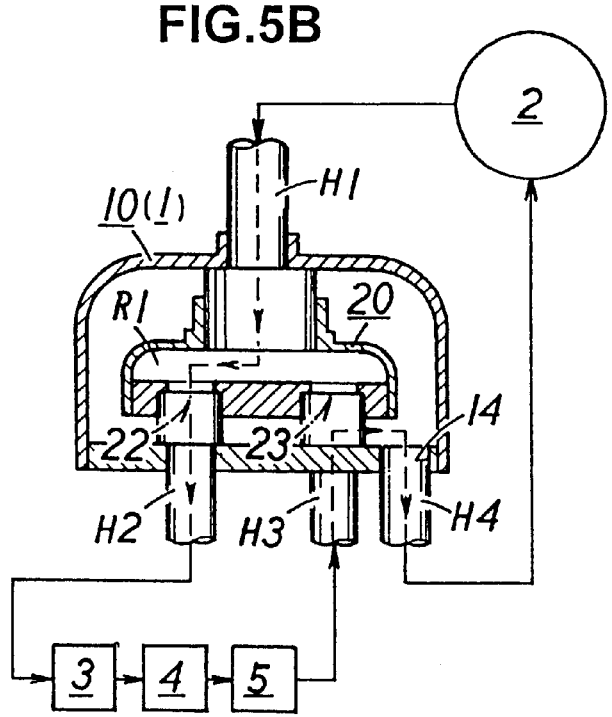
Figure 6A:
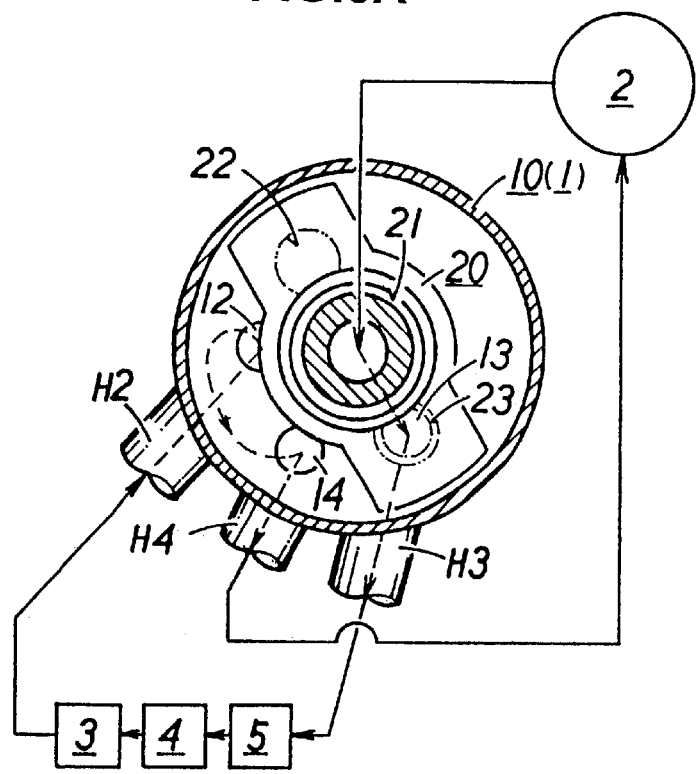
FIGS. 6A and 6B are horizontal and vertical sectional views, respectively, of the device, showing the flow of the operating medium in the cooling/dehumidifying mode of operation.
Figure 6B:
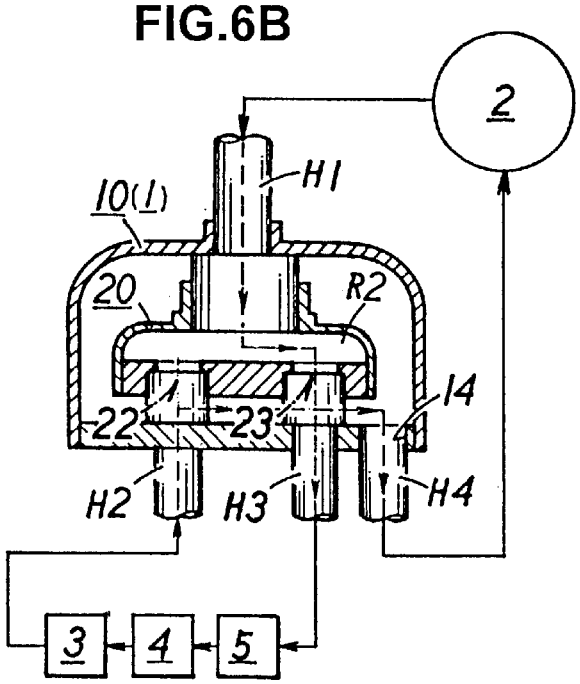

In the heating mode of operation, the second selectively positionable opening 22 of the valve body 20 is connected to the second pipe H2, and the third selectively positionable opening 23 is kept out of connection with the third pipe H3 as shown in FIGS. 3, 5A and 5B. In this cycle of operation, an operating medium is fed from the compressor 2, flows through the first pipe H1, the first flow passageway R1, the second pipe H2, the indoor heat exchanger 3, the capillary tube 4, the outdoor heat exchanger 5, the third pipe H3, the interior of the casing 10, the fourth port 14 and the fourth pipe H4, and is returned to the compressor 2.

(2) Cooling/Dehumidifying Mode

In the cooling/dehumidifying mode, the third selectively positionable opening 23 of the valve body 20 is connected to the third pipe H3, and the second selectively positionable opening 22 is kept out of connection with the second pipe H2 as shown in FIGS. 4, 6A and 6B. In this cycle of operation, an operating medium is fed from the compressor 2, flows through the first pipe H1, the second flow passageway R2, the third pipe H3, the outdoor heat exchanger 5, the capillary tube 4, the indoor heat exchanger 3, the second pipe H2, the interior of the casing 10, the fourth port 14 and the fourth pipe H4, and is returned to the compressor 2.

Reference will now be made to a sealing structure between the first port 11 and the first selectively positionable opening 21 which is designed to achieve the fourth object of the present invention. Specifically, a bellows seal 25a is disposed between the first port 11 and the first selectively positionable opening 21. In the embodiment shown in FIG. 10, the bellows seal 25a has, for example, a cup-shape and is arranged upside down. The bellows seal 25a can follow movement of the valve body 20 in various directions and accommodate a change in the internal pressure of the casing 10 to provide a high level of sealability.

SECOND EMBODIMENT

Reference will now be made to a drive mechanism for driving the rotary valve body 20, a flow passage arrangement by which the interior of the casing 10 is constantly under low pressure or under high pressure, and a positional relationship between the second and third selectively positionable openings 22, 23 and the first selectively positionable opening 21. A specific embodiment is shown in FIGS. 11A to 14B and is basically similar in structure to that shown in FIGS. 1A to 9. A feature of this embodiment is such that the second selectively positionable opening 22 and the third selectively positionable opening 23 are located at opposite sides of the first selectively positionable opening 21 and arranged in a diametrically opposed relationship. Referring to FIGS. 11A to 12B, the interior of the casing 10 is constantly under low pressure as in the embodiment shown in FIGS. 1A to 9. In this case, the first port 11 is connected to the outlet port of the compressor 2, and the fourth port 14 is connected to the inlet port of the compressor 2.

Referring to FIGS. 13A to 14B, the interior of the casing 10 is constantly under high pressure. In this case, the first port 11 is connected to the inlet port of the compressor 2, and the fourth port 14 is connected to the outlet port of the compressor 2. A condenser is designated by the reference letter C and constitutes a combination of the indoor heat exchanger 3, the capillary tube 4 and the outdoor heat exchanger 5 as in the embodiment shown in FIGS. 1A to 9. In the embodiment shown in FIGS. 11A to 14B, the interior of the casing 10 is constantly under low or high pressure. A uniform pressure is exerted on the entire circumference of the valve body 20 to smoothly and stably rotate the valve body 20 and appropriately change the direction of flow of an operating medium.

The second selectively positionable opening 22 and the third selectively positionable opening 23 are located at opposite sides of the first selectively positionable opening 21 in a diametrically opposed relationship. This arrangement minimizes differential pressure between upward pressure and downward pressure developed in the axial direction of the first selectively positionable opening 21 and effectively eliminates uneven loads to the valve body 20. This embodiment thus maintains sealing integrity which may deteriorate when the valve body 20 is inclined.

THIRD EMBODIMENT

Reference will be made to the embodiment shown in FIGS. 15A to 20 designed to achieve the second object of the present invention. This embodiment is basically similar in structure to the embodiment shown in FIGS. 1A to 9 as well as the embodiment shown in FIGS. 11A to 14B. As a feature, sealing elements 25 are disposed between the second port 12 and the second selectively positionable opening 22 and between the third port 13 and the third selectively positionable opening 23, respectively. The sealing elements 25 each have a suitable configuration and structure. As another feature, a first effective pressure bearing area S1 on which pressure is applied by an operating medium flowing through the first selectively positionable opening 21 is set to be greater than a second effective pressure bearing area S2 on which pressure is applied by the operating medium flowing through the second selectively positionable opening 22 and the third selectively positionable opening 23. The resulting differential pressure improves the sealing integrity of the sealing elements 25. In the illustrated embodiment, the pipes H2 to H4 connected to a bottom of the casing 10 are each arranged, for example, in a manner to be bent radially outward, as shown in FIGS. 15A, 16A, 17A and 19A. Alternatively, depending on an installation space for an air conditioning machine and the like, or various conditions regarding parts or members which are connected to the bottom of the device 1, the pipes H2 to H4 may be arranged so as to extend straight downwards from the casing 10.

The embodiment shown in FIGS. 15A(15B) and 16A (16B) will first be described with respect to its basic structure. Modified parts will then be explained with reference to FIGS. 17A to 20. In the embodiment shown in FIGS. 15A(15B) and 16A(16B), the sealing elements 25 are disposed between the first port 11 and the first selectively positionable opening 21, between the second selectively positionable opening 22 and the second port 12, and between the third selectively positionable opening 23 and the third port 13, respectively.

Figure 10:
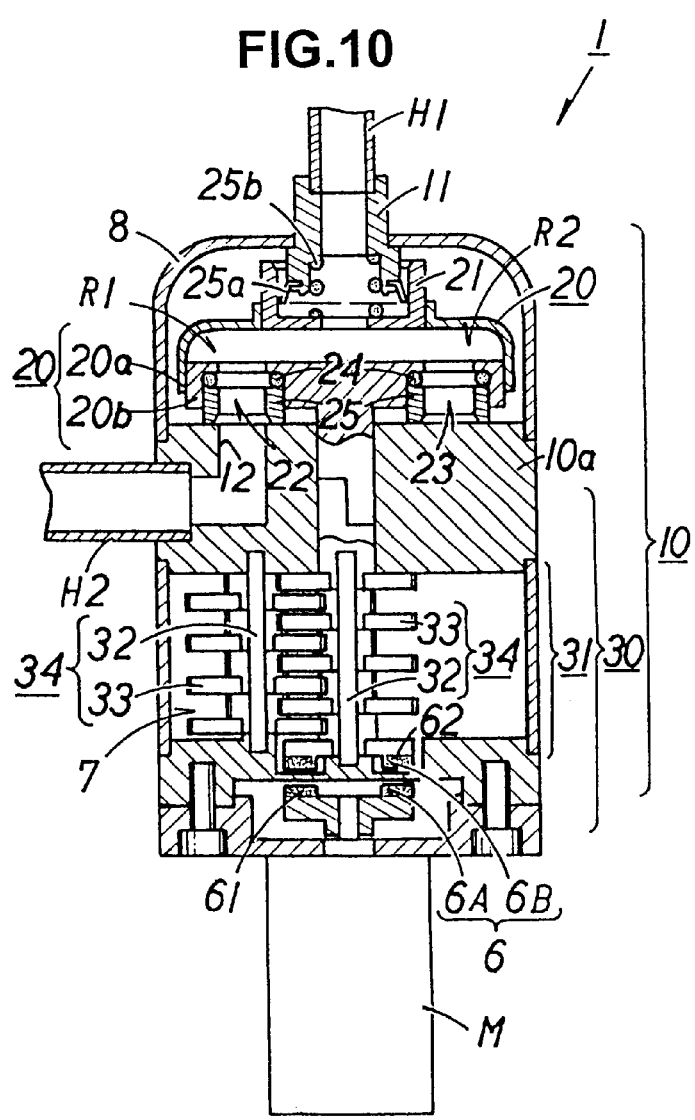
FIG. 10 is a vertical sectional view of the device, showing a bellows seal disposed between a first port and a first selectively positionable opening.
Figure 11A:
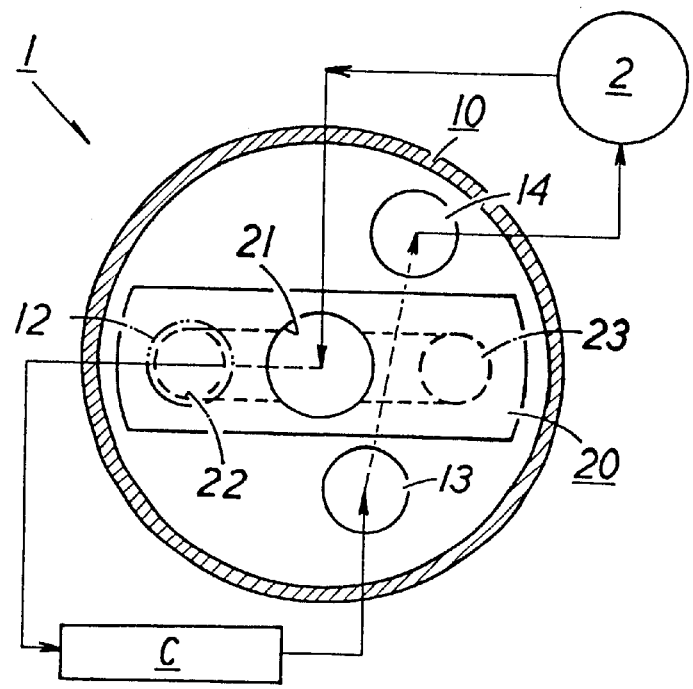
FIGS. 11A and 11B are horizontal and vertical sectional views, respectively, of a second embodiment in a heating mode of operation.
Figure 11B:
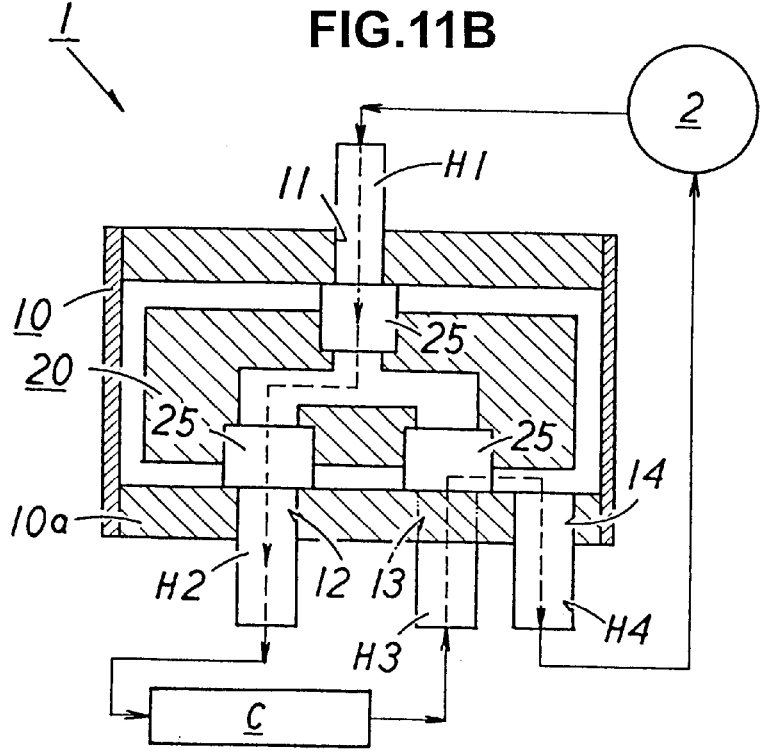
Figure 12A:
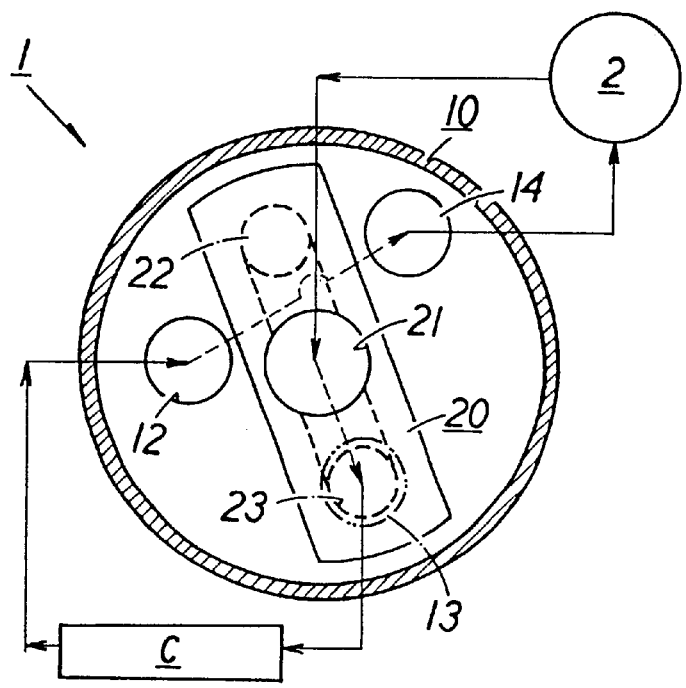
FIGS. 12A and 12B are horizontal and vertical sectional views, respectively, of the second embodiment in a cooling mode of operation.
Figure 12B:
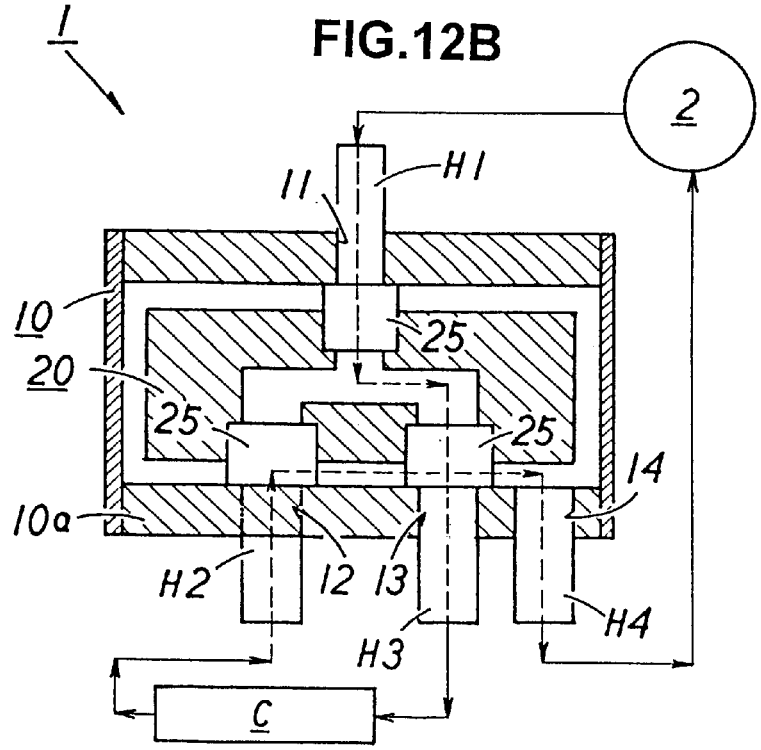
Figure 13A:
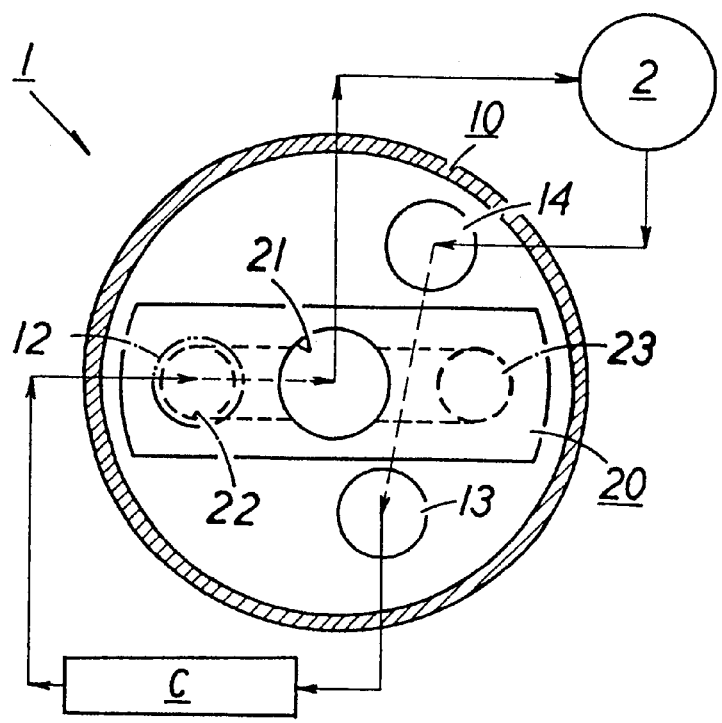
FIGS. 13A and 13B are horizontal and vertical sectional views, respectively, of the second embodiment wherein the casing is constantly under high pressure in the heating mode of operation.
Figure 13B:
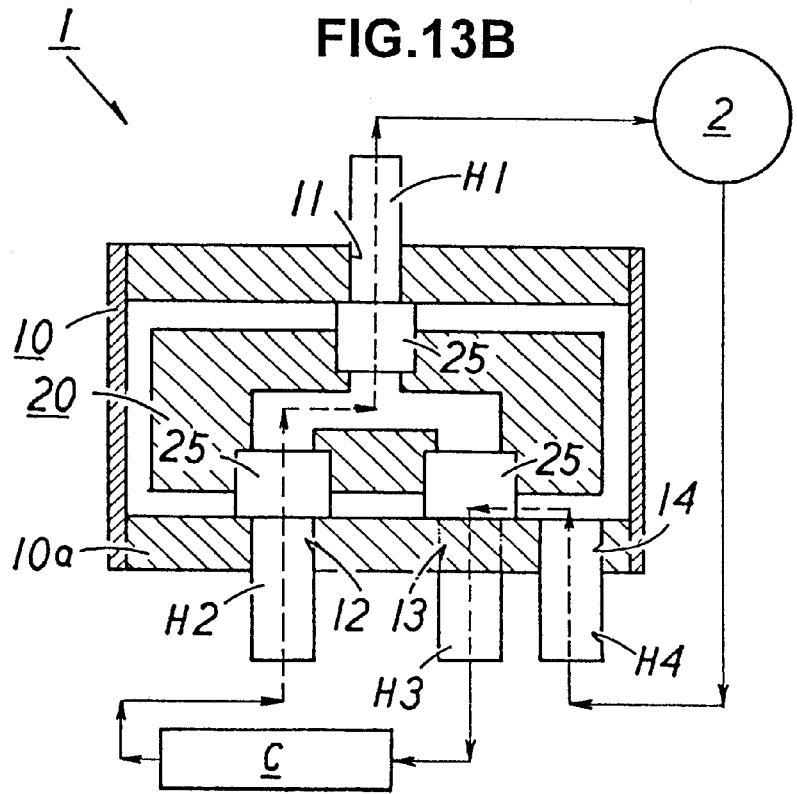
Figure 14A:
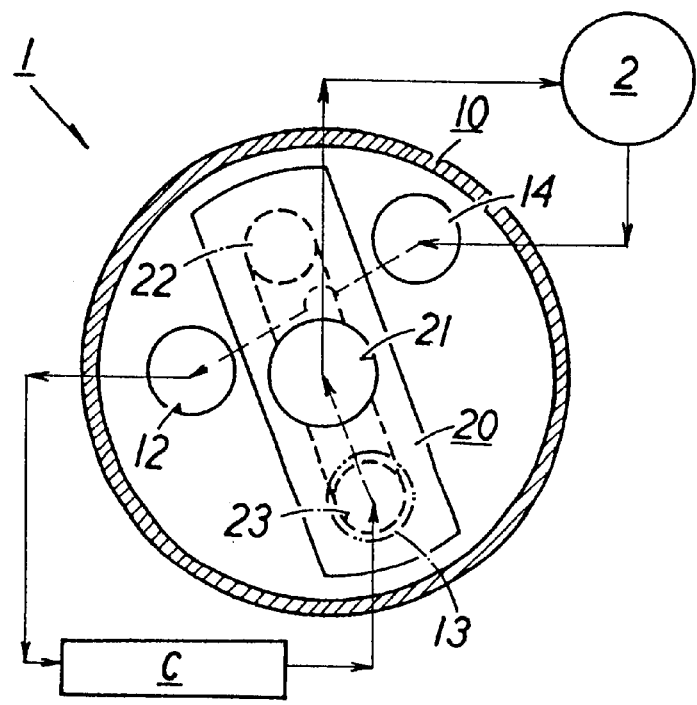
FIGS. 14A and 14B are horizontal and vertical sectional views, respectively, of the second embodiment wherein the casing is constantly under high pressure in the cooling mode of operation.
Figure 14B:
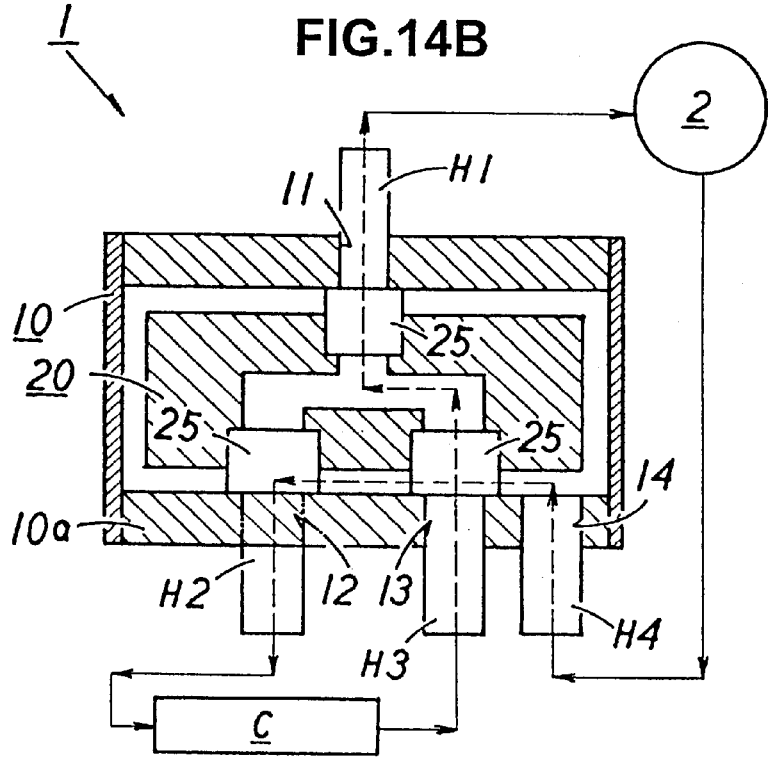
Figure 15A:
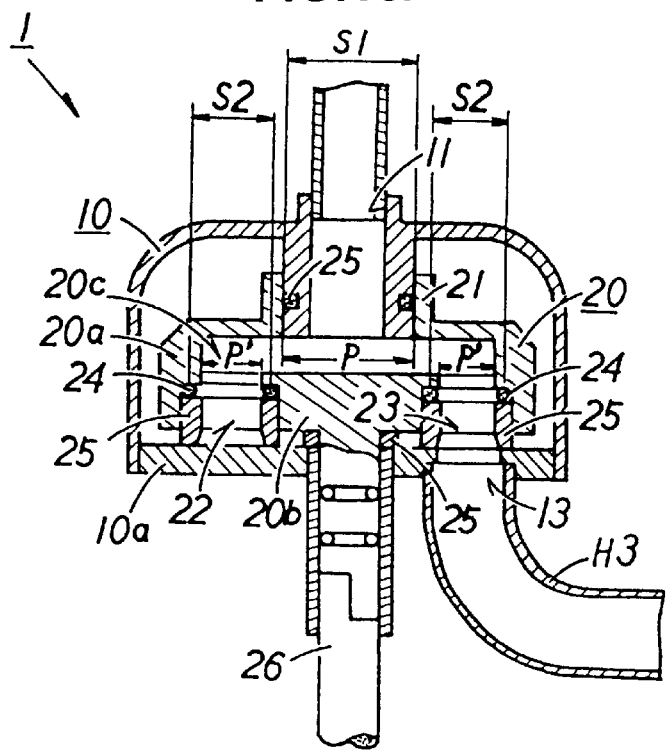
FIG. 15A is a vertical sectional view of a third embodiment.

Referring to FIGS. 15A(15B) and 16A(16B), the first port 11 and the first selectively positionable opening 21 collectively form a telescopic joint. The sealing element 25 is in the form of a ring and is disposed between the first port 11 and the first selectively positionable opening 21. However, the bellows seal 25a shown in FIG. 10 is preferably disposed between the first port 11 and the first selectively positionable opening 21. This is also the case with various other embodiments which will later be described. The sealing elements 25 disposed between the second port 12 and the second selectively positionable opening 22 and between the third selectively positionable opening 23 and the third port 13 are cylindrical in shape as shown in FIGS. 15A(15B) and 16A(16B). The sealing elements 25 are axially movable within these ports under the influence of an elastic element such as the O-rings 24. This arrangement urges the sealing elements 25 against the upper surface of the partition 10a. The sealing elements 25 of a cylindrical shape may be adhesively attached or otherwise secured to the valve body 20.

In this embodiment, the first effective pressure bearing area S1 is set to be greater than the second effective pressure bearing areas S2 (the sum of the areas on which pressure is applied by the operating medium flowing through the second selectively positionable opening 22 and the third selectively positionable opening 23). This difference in areas brings about a variation in pressure exerted on the valve body 20.

Figure 17A:
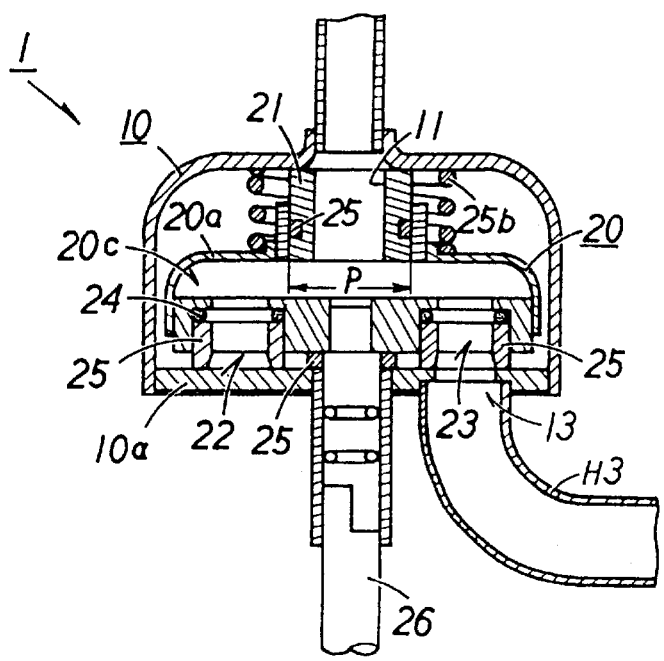
FIG. 17A is a vertical sectional view of the device into which a supplemental spring is incorporated.
Figure 17B:
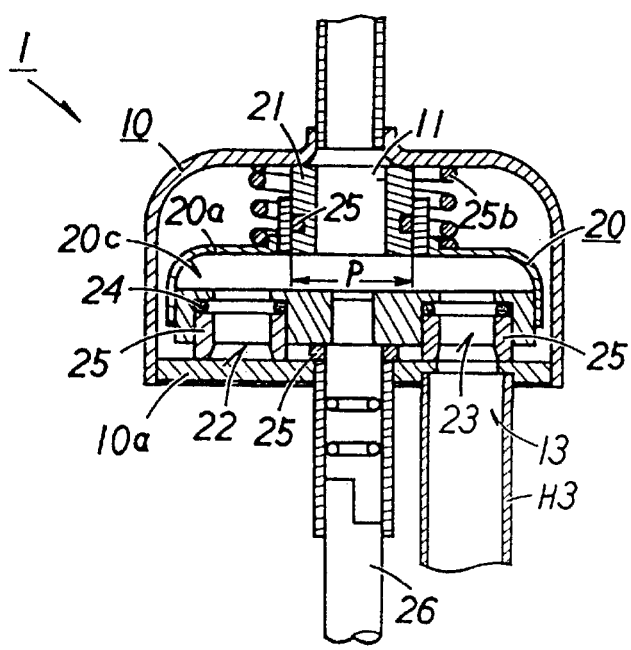
FIG. 17B is a view similar to that of FIG. 17A, showing another modified form of the device wherein second to fourth pipes are extended straight downwards.
Figure 18:
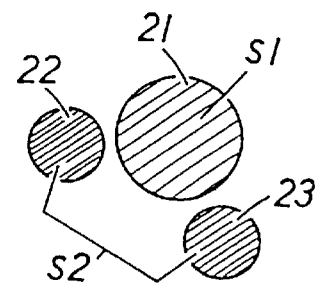
FIG. 18 is a plan view showing effective pressure bearing areas in the embodiments shown in FIGS. 15 to 17B.

Due to the differential pressure, the valve body 20 is urged toward the second port 12 and the third port 13. At this time, the valve body 20 is slightly moved to thereby urge the sealing elements 25 against the upper surface of the partition 10a adjacent to the peripheral edge of each of the second port 12 and the third port 13. As shown in FIG. 17A or 17B, a supplemental spring 25b may be provided to exert supplemental pressure on the valve body 20. Illustratively, the supplemental spring 25b is in the form of a compression coil spring. The supplemental spring 25b is compressively disposed between the top wall of the casing 10 and a part of the valve body 20 adjacent to the first selectively positionable opening 21 although the position of the coil spring 25b is not limited thereto. As previously explained, the supplemental spring 25b provides supplemental pressure rather than significantly enhances the sealing integrity of the sealing elements. As such, the supplemental spring 25b has a relatively small spring constant.

In the embodiment shown in FIGS. 15A(15B) and 16A (16B), the sealing element 25 is additionally disposed between the rotary shaft 26 and the partition 10a and has a cylindrical shape. The sealing element 25 is fixedly secured to the rotary shaft 26. Alternatively, the sealing element 25 may be loosely fit around the rotary shaft 26. In such a case, differential pressure resulting from the difference in the effective pressure bearing areas urges the valve body 20 against the partition 10a.

Figure 15B:
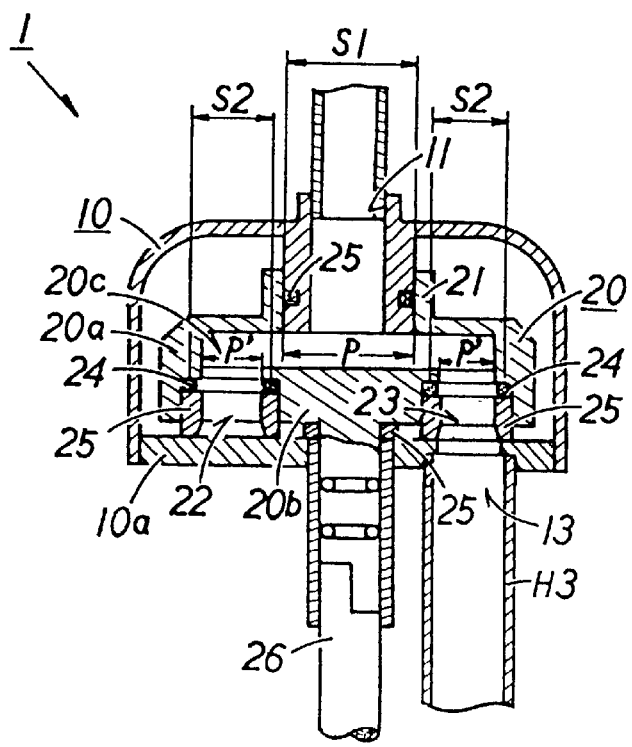
FIG. 15B is a view similar to that of FIG. 15A, showing a modified form of the third embodiment wherein second to fourth pipes are extended straight downwards.
Figure 16A:
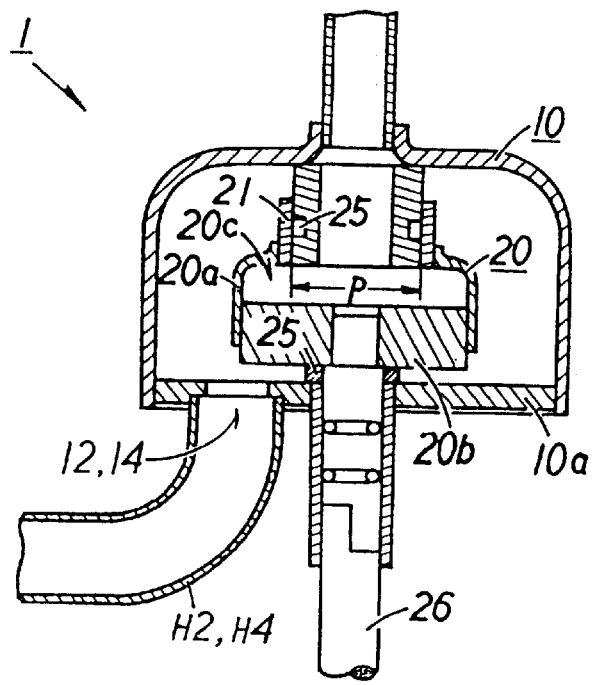
FIG. 16A is a view similar to that of FIG. 15A, but the device is rotated by 90 degrees from the position shown in FIG. 15A.
Figure 16B:
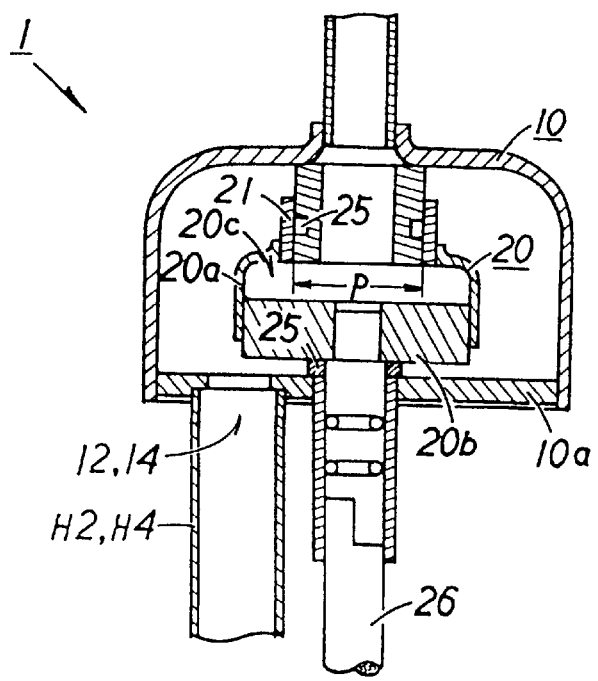
FIG. 16B is a view similar to that of FIG. 16A, showing the modified form of the third embodiment shown in FIG. 15B.

Referring to FIG. 15A or 15B, the central region of the closure plate 20b which faces the first selectively positionable opening 21 forms a pressure bearing surface P. The inner top surface of the valve housing 20a which faces the second selectively positionable opening 22 and the third selectively positionable opening 23 forms a pressure bearing surface P'. The differential pressure is exerted on the pressure bearing surface P whereby the valve body 20 is slightly moved toward the second port 12 and the third port 13 so as to apply a given force to the sealing elements 25 disposed between the second selectively positionable opening 22 and the second port 12, between the third selectively positionable opening 23 and the third port 13, and around the rotary shaft 26, respectively. A balanced pressure will be exerted on the valve body 20 since the pressure bearing surface P is located centrally in the valve body 20.

Figure 19A:
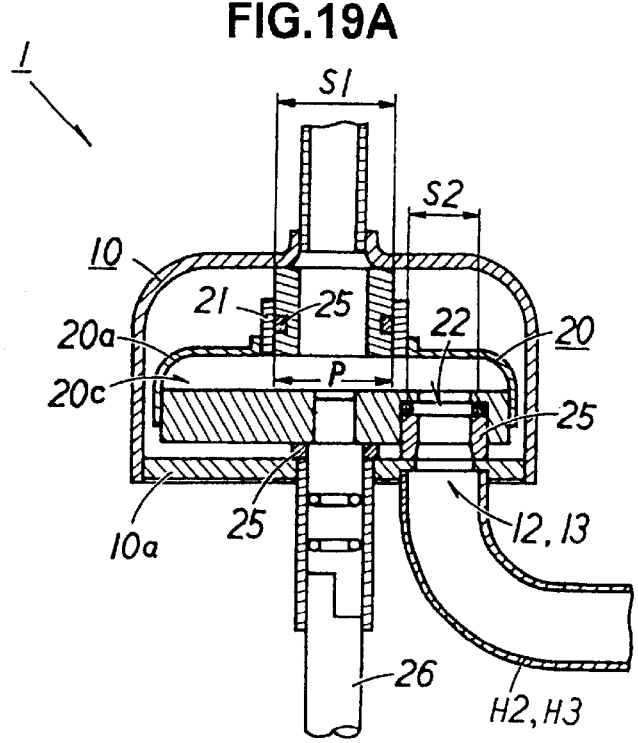
FIG. 19A is a vertical sectional view of a modification of the device wherein the use of a third selectively positionable opening is eliminated.
Figure 19B:
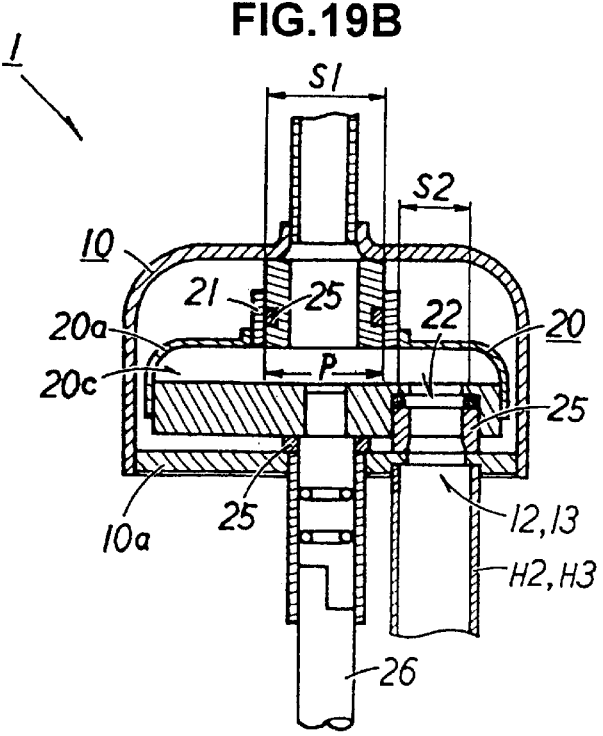
FIG. 19B is a view similar to that of FIG. 19A, showing a further modified form of the device wherein second to fourth pipes are extended straight downwards.
Figure 20:
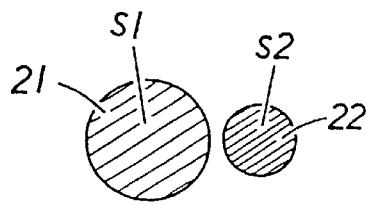
FIG. 20 is a plan view showing effective pressure bearing areas in the modification shown in FIG. 19.

Reference will next be made to the embodiment shown in FIGS. 19A, 19B and 20. The third selectively positionable opening 23 used in the embodiment shown in FIGS. 15A (15B) and 16A(16B) is absent from this embodiment. Only the second selectively positionable opening 22 is selectively connected to the second port 12 and the third port 13. As the valve body 20 is rotated to a predetermined angle in one direction, the second selectively positionable opening 22 is brought into communication with the second port 12. As the valve body 20 is rotated by the predetermined angle in the opposite direction, the second selectively positionable opening 22 is brought into communication with the third port 13.

As in the embodiment shown in FIGS. 15A(16A) and 16A(16B), the first effective pressure bearing area S1 is set to be greater than the second effective pressure bearing area S2. In this case, S2 indicates the area on which pressure is applied by an operating medium flowing only through the second selectively positionable opening 22 since the third selectively positionable opening 23 is absent. This difference in area causes differential pressure to be applied to the valve body 20. This differential pressure urges the sealing elements 25 against a portion of the partition 10a where the second port 12 and the third port 13 are formed. This embodiment may include the supplement spring 25b shown in FIG. 17A or 17B.

In the embodiment shown in FIGS. 15A to 18, differential pressure A resulting from the difference between the first and second effective pressure bearing areas S1 and S2 is represented in the following equation.

$$A \text{ (differential pressure)} = (P1-P2) \times (\pi D^2/4 - 2 \times \pi d^2/4)$$

where P1 is a high pressure (kgf/cm$^2$), P2 is a low pressure (kgf/cm$^2$), $\phi$D is a large diameter (cm)(first selectively positionable opening side), and $\phi$d is a small diameter (cm)(second or third selectively positionable opening side).

If P1 is 15 kgf/cm$^2$, P2 is 5 kgf/cm$^2$, $\phi$D is $\phi$18 mm and $\phi$d is $\phi$9.5 mm, $$A = (15-5)\left(\pi \times 1.8^2/4 - 2 \times \pi \times 0.95^2/4\right)$$

$$= 11.2 \text{ kgf (force applied to the second and third ports)}$$

ports).

In the embodiment shown in FIGS. 19A,19B and 20, differential pressure A is represented in the following equation.

$$A \text{ (differential pressure)} = (P1-P2) \times (\phi D^2/4 - \tau d^2/4)$$

where P1 is a high pressure (kgf/cm$^2$), P2 is a low pressure (kgf/cm$^2$), $\phi$D is a large diameter (cm)(first selectively positionable opening side), and $\phi$d is a small diameter (cm)(second or third selectively positionable opening side).

If P1 is 15 kgf/cm$^2$, P2 is 5 kgf/cm$^2$, $\phi$D is $\phi$18 mm and $\phi$d is $\phi$9.5 mm, $$A = (15-5)\left(\pi \times 1.8^2/4 - \pi \times 0.95^2/4\right)$$

$$= 18.3 \text{ kgf (force applied to the second port)}$$

In the embodiment shown in FIGS. 15A to 20, there is no need to provide any extra means for urging the valve body 20 against the partition 10a. The differential pressure is advantageously utilized to urge the valve body 20 to press the sealing elements 25 against the partition 10a so as to provide hermetic connection between the second selectively positionable opening 22 and the second port 12 and between the third selectively positionable opening 23 and the third port 13. This arrangement thus provides a simple and highly reliable rotary-type device for changing the flow of an operating medium.

FOURTH EMBODIMENT

Reference will next be made to other details and modifications. The embodiment shown in FIGS. 21A to 27C is basically similar in structure to that shown in FIGS. 1A to 9. A feature of this embodiment is such that the second port 12 or the third port 13 into which an operating medium under high pressure flows from the compressor 2 is disconnected from the second selectively positionable opening 22 or the third selectively positionable opening 23 to be opened so as to eliminate differential pressure within the casing 10 when a change in the mode of operation takes place.

Figure 21A:
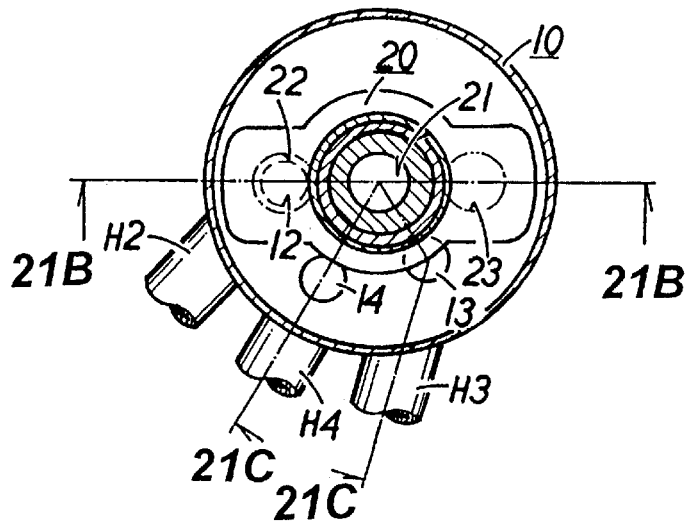
FIG. 21A is a horizontal sectional view of a fourth embodiment.
Figure 21B:
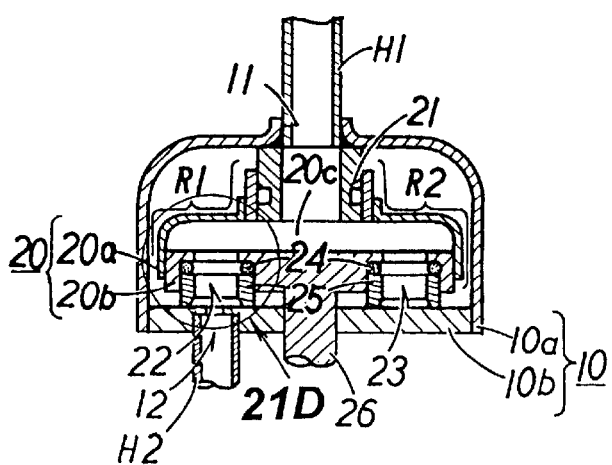
FIG. 21B is a vertical sectional view taken on the line 21B—21B in FIG. 21A.
Figure 21C:
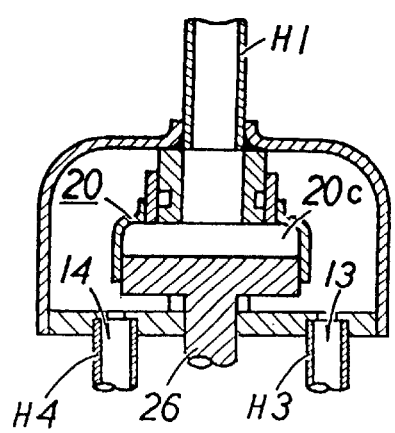
FIG. 21C is a vertical sectional view taken on the line 21C—21C in FIG. 21A.
Figure 21D:
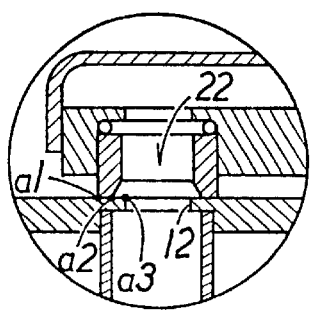
FIG. 21D is an enlarged view of a portion 21D of the valve body as encircled in FIG. 21B.

The drive mechanism 30 or the motor M is required to include means for temporarily stopping the rotary shaft 26 during a change in the mode of operation, or means for changing the speed or rotation of the rotary shaft 26 before and after differential pressure is eliminated. In FIG. 21D, the reference characters a1 and a2 designate contact points between the second selectively positionable opening 22 and the sealing element 25. The reference character a3 designates an inner peripheral portion of the second port 12. These contact points a1, a2 and the inner peripheral portion a1 of the second port 12 are shown in plan in FIGS. 22A and 23A.

The operation of the device is as follows. For purposes of explanation, the device is initially in the heating mode of operation. After the device is stopped, the device proceeds to the mode of cooling/dehumidifying operation.

(1) Heating Mode

During the heating operation, the second selectively positionable opening 22 of the valve body 20 is connected to the second port 12 (the second pipe H2), and the third selectively positionable opening 23 is kept out of communication with the third port 13 (the third pipe H3) as shown in FIG. 3. In this cycle of operation, an operating medium is fed from the compressor 2, then flows through the first pipe H1, the first flow passageway R1, the second pipe H2, the indoor heat exchanger 3, the capillary tube 4, the outdoor heat exchanger 5, the third pipe H3, the interior of the casing 10, the fourth port 14 and the fourth pipe H4, and is returned to the compressor 2. Within the casing 10, an operating medium under high pressure fed from the compressor 2 flows within the valve body 20, whereas an operating medium under low pressure flows outside of the valve body 20 and is then fed to the compressor 2. There is thus a difference in pressure between the interior and exterior of the valve body 20.

(2) Change in Mode of Operation

Figure 22A:
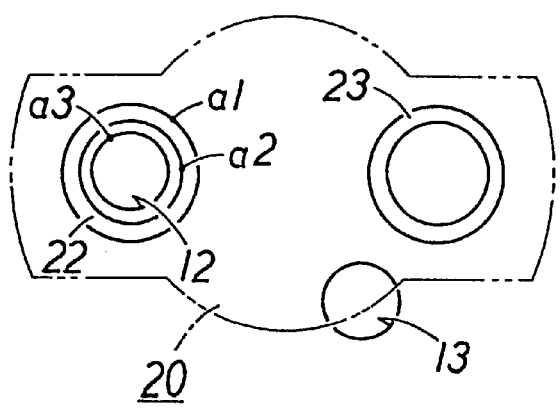
FIGS. 22A to 22C show the first half of a sequence of operation when the heating mode is switched to the cooling/dehumidifying mode.
Figure 22B:
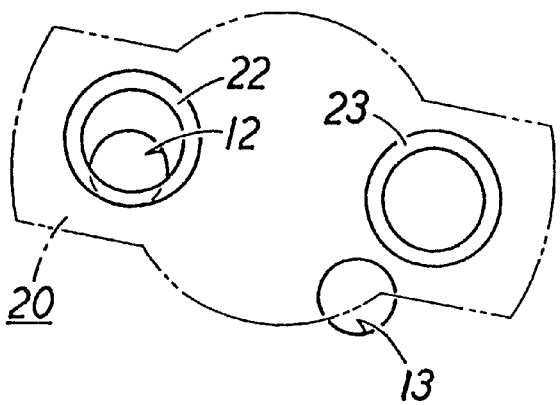
Figure 22C:
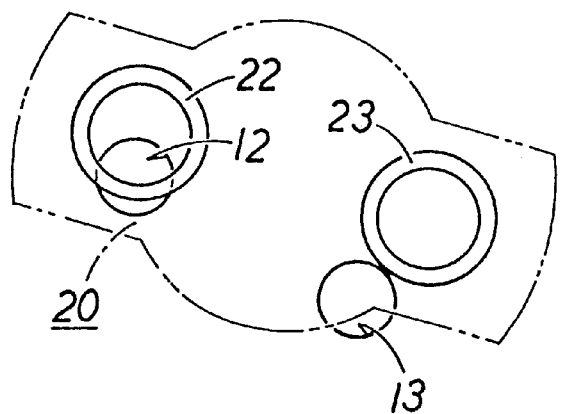
Figure 23A:
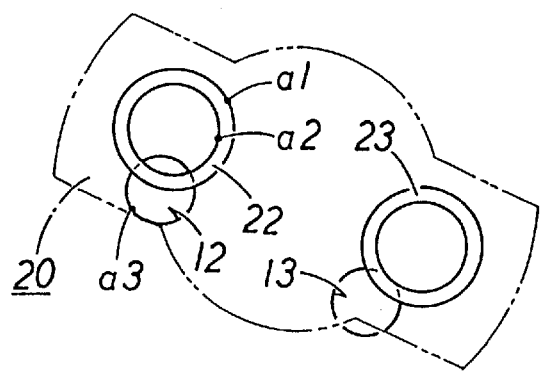
FIGS. 23A and 23B show the second half of a sequence of operation when the heating mode is switched to the cooling/dehumidifying mode.
Figure 23B:
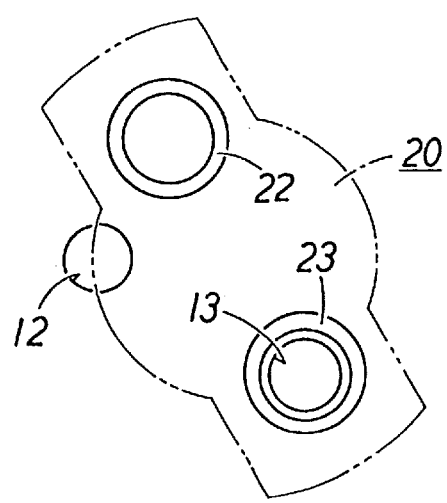

To change the mode of operation, it is necessary to first stop the heating operation. The initial condition of the valve body 20 is the same as that during the heating operation as shown in FIG. 22A. A magnet or similar drive element is then energized to rotate the valve body 20 via the rotary shaft 26. As the valve body 20 is rotated, the second port or high pressure outlet 12 and the second selectively positionable opening 22 are moved away from each other to interrupt communication therebetween, and the third port or low pressure inlet 13 and the third selectively positionable opening 23 are moved toward each other. When the second port 12 is inscribed in the second selectively positionable opening 22 as shown in FIG. 22B, communication of the second port 12 with the second selectively positionable opening 22 starts to be interrupted and opening of the second port or high pressure outlet 12 begins. Further rotation causes the second port 12 to be more widely opened as shown in FIG. 22C. Thereafter, the valve body 20 is tentatively stopped. While the valve body 20 is stopped, the operating medium under high pressure is caused to flow toward a lower pressure region. This eliminates differential pressure within the casing 10. When the valve body 20 is again rotated, the low pressure inlet or third port 13 is slightly overlapped with the third selectively positionable opening 23 as shown in FIG. 23A. Further rotation of the valve body 20 causes the third port 13 and the third selectively positionable opening 23 to be finally communicated with one another, as shown in FIG. 23B, to initiate the cooling and dehumidifying mode of operation. It is best to restart rotation of the valve body 20 when the pressure within the casing 10 becomes completely uniform. This is because the device is subject to substantially no shock at that time. In practice, however, rotation of the valve body 20 is restarted while a slight differential pressure still remains, provided that such differential pressure does not cause the device to be subjected to shock.

Figure 24:
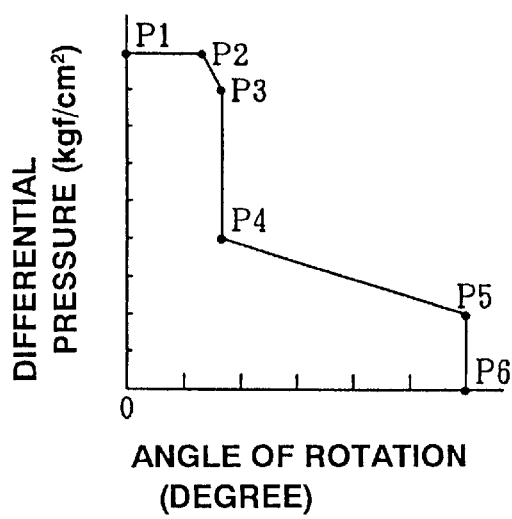
FIG. 24 is a graph showing the relationship between the angle of rotation of the valve body and differential pressure when rotary movement of the valve body is stopped once to reduce the differential pressure.

FIG. 24 illustrates the relationship between the angle of rotation of the valve body 20 and differential pressure within the casing 10. P1 is a point at which the device is in the heating mode of operation. P6 is a point at which the device is in the cooling/dehumidifying mode of operation. P2 is a point at which the device is in the position shown in FIG. 22B. P3 and P4 are points at which the rotary valve 20 is stopped as shown in FIG. 22C. From the point P1 to the point P2, the valve body 20 is rotated, but differential pressure is not eliminated. The pressure within the casing 10 becomes uniform after the point P2. From the point P3 to the point P4, the valve body 20 is tentatively stopped, and the differential pressure is reduced. From the point P5 to the point P6, rotation of the valve body 50 is completely stopped, and the differential pressure is further reduced.

(3) Cooling/Dehumidifying Mode

During the cooling and dehumidifying operation, the third selectively positionable opening 23 is connected to the third port 13 (the third pipe H3), and the second selectively positionable opening 22 is kept out of communication with the second port 12 (the second pipe H2) as shown in FIG. 4. In this cycle of operation, an operating medium is fed from the compressor 2, then flows through the first pipe H1, the second flow passageway R2, the third pipe H3, the outdoor heat exchanger 5, the capillary tube 4, the indoor heat exchanger 3, the second pipe H2, the interior of the casing 10, the fourth port 14 and the fourth pipe H4, and is returned to the compressor 2. Within the casing 10, an operating medium under high pressure fed from the compressor 2 flows within the valve body 20, whereas an operating medium under low pressure flows outside of the valve body 20. There is thus a difference in pressure between the interior and exterior of the valve body 20, as in the heating mode of operation.

A change in the mode of operation takes place when the foregoing cycle of operation is reversed. At that time, the third port 13 serves as a high pressure outlet, and the second port 12 serves as a low pressure inlet.

Figure 25:
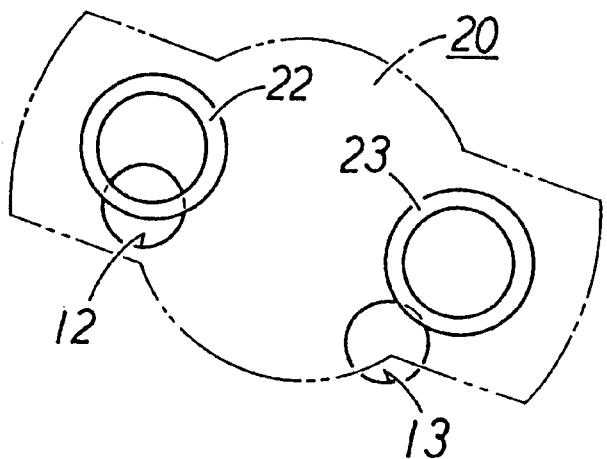
FIG. 25 illustrates the position of the valve body at which a change in the speed of rotation of the valve body takes place.
Figure 26:
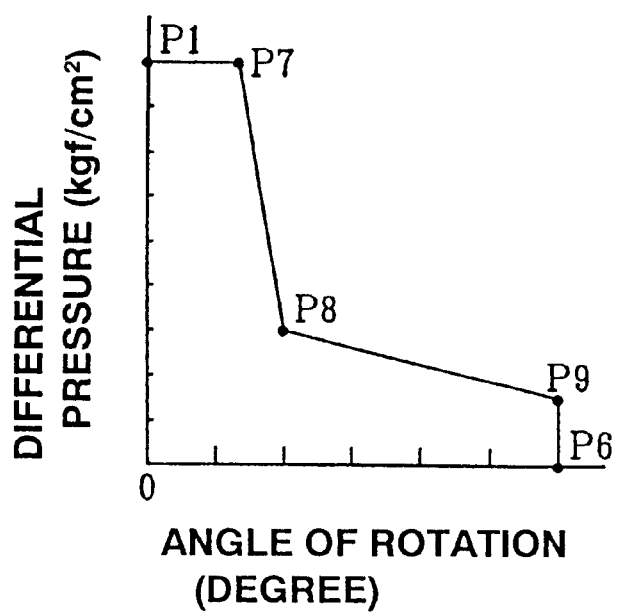
FIG. 26 is a graph showing the relationship between the angle of rotation of the valve body and differential pressure.

This embodiment may be modified as follows. In the embodiment shown in FIGS. 21A to 24, the differential pressure is eliminated after rotation of the valve body 20 is stopped. If there is a need to reduce the time required to switch the mode of operation, the valve body 20 may be rotated at a low speed until differential pressure is eliminated. The valve body 20 may be rotated at a higher speed when there remains no differential pressure. In such a case, a change in the speed of rotation of the valve body 20 should take place before the third port 13 and the third selectively positionable opening 23 are brought into communication with each other as shown in FIG. 25. FIG. 26 shows the relationship between the angle of rotation of the valve body 20 and differential pressure within the casing 10. P1 is a point at which the device is in the heating mode of operation. P6 is a point at which the device is in the cooling/dehumidifying mode of operation. From the point P1 to the point P7, the high pressure outlet is not opened although the valve body 20 is rotated. The differential pressure is not reduced until the point P7. From the point P7 to the point P8, the valve body 20 is rotated at a low speed to reduce the differential pressure. From the point P8 to the point P9, the valve body 20 is rotated at a higher speed to further reduce or eliminate the differential pressure.

Figure 27A:
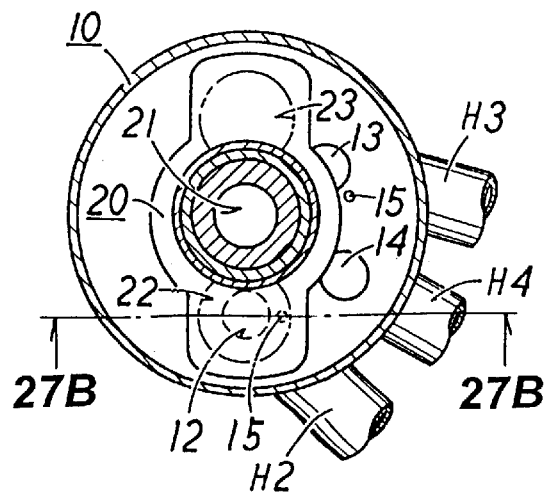
FIG. 27A is a horizontal sectional view of another embodiment with a pilot hole.
Figure 27B:
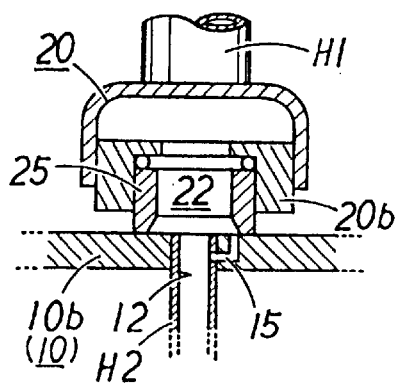
FIG. 27B is a vertical sectional view taken on the line 27B—27B in FIG. 27A.
Figure 27C:
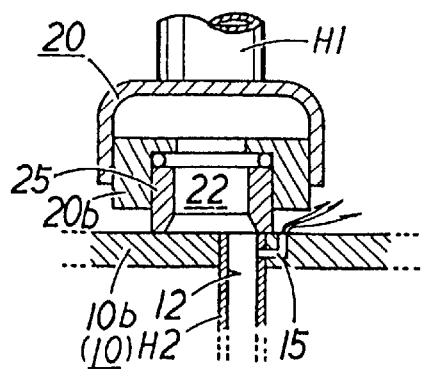
FIG. 27C is a view similar to that of FIG. 27B, but showing that the pilot hole is opened.

In any of the foregoing embodiments, communication of the high pressure outlet with the selectively positionable opening is interrupted and the high pressure outlet is directly opened to allow an operating medium under high pressure to flow out of the high pressure outlet so as to reduce differential pressure. Alternatively, a pilot hole 15 may be formed in a portion of the partition adjacent to the second port 12 and the third port 13, as shown in FIGS. 27A and 27B. In such a case, the pilot hole 15 may be opened and closed mechanically by separate means. The valve body 20 may be rotated so as to first open the pilot valve 15 as shown in FIG. 27C. The timing at which the valve body 20 is rotated relative to the casing 10 may then be adjusted so as to eliminate differential pressure within the casing 10.

In the embodiment shown in FIGS. 21A to 27C, differential pressure within the casing 10 is eliminated by adjusting the timing at which the valve body 20 is rotated relative to the casing 10. There is thus no need to provide any means for absorbing shock which may occur as a result of changes in pressure. Accordingly, this embodiment can reduce the production cost of the device and simplify required parts. Also, differences in pressure and temperature which may occur when a change in the mode of operation takes place can be eliminated in a short period of time. This embodiment also allows the mode of operation to be smoothly and safely changed.

Where rotation of the valve body 20 is stopped once to eliminate differential pressure, it is possible to reduce shock which may occur as a result of changes in pressure and temperature when a change in the mode of operation takes place. This leads to a substantial increase in the durability of the device. Where the valve body 20 is rotated at a higher speed after differential pressure within the casing 10 is eliminated, it is possible to eliminate differences in pressure and temperature in a short period of time and absorb shock to which the device is subjected. The high rotational speed of the valve body 20 brings about a reduction in the time required to switch the mode of operation.

In the illustrated embodiment, it has been emphasized that communication of the high pressure outlet with respect to the selectively positionable opening 22 or 23 is interrupted and an opening is formed during rotating of the valve body 20 whereby the differential pressure within the casing 10 is eliminated. In forming the opening, it does not only necessarily follow that the differential pressure is eliminated, but further that the flow rate at which the operating medium flows out of the opening can be positively controlled by controlling the amount of the rotation of the valve body 20, 50 that the heating/cooling operation can be carried out in response to the required capacity of heating/cooling.

FIFTH EMBODIMENT

Another embodiment will now be described with reference to FIGS. 28A to 32D. This embodiment is basically similar in structure to that shown in FIGS. 1A to 9. As a feature, there is provided a pressure absorbing mechanism designed to gradually reduce fluid pressure within the device. This embodiment also employs modified form of the drive source and the drive mechanism 30 used in the embodiment shown in FIGS. 1A to 9. This difference and other details will be described hereinbelow.

Reference will first be made to a pressure absorbing mechanism as a principal feature of this embodiment. This mechanism includes a pressure absorbing valve 130 provided below the first selectively positionable opening 21. As the pressure absorbing valve 130 is moved upward, the first selectively positionable opening 21 is communicated with the remaining space in the casing 10 through a pressure control hole 131, a valve chamber 127 and a bore 128 so as to reduce differential pressure within the casing 10. The pressure control hole 131 is defined in the pressure absorbing valve 130. The bore 128 is defined in the lower end of the valve chamber 127.

The pressure absorbing mechanism is disposed between the rotary shaft 26 and the first selectively positionable opening 21 in the valve body 20. The valve chamber 127 is defined in the valve body 20 to receive the pressure absorbing valve 130. Illustratively, the valve chamber 127 has a tapered end or contact face 127a so that the pressure absorbing valve 130 can be closely received in the valve chamber 127 during operation. The bore 128 is communicated with the remaining space in the casing 10.

As shown in FIGS. 28B and 29A to 29C, the pressure absorbing valve 130 is located below the first selectively positionable opening 21 and supported by a spring 132. The spring 132 allows the pressure absorbing valve 130 to project from the valve chamber 127. The pressure absorbing valve 130 has a tapered end 130a which is maintained in close contact with the contact face 127a of the valve chamber 127 to thereby close the bore 128 when pressure is applied thereto.

The pressure control hole 131 extends substantially along the central axis of the pressure absorbing valve 130 and provides communication between the first selectively positionable opening 21 and the valve chamber 127. The pressure control hole 131 is branched so as to communicate with a space within which the spring 132 is received. When the pressure absorbing valve 130 is in its raised or open position, the first selectively positionable opening 21 is communicated with the remaining space in the casing 10 through the pressure control hole 131, the valve chamber 127 and the bore 128. In the illustrated embodiment, the spring 132 is employed to support the pressure absorbing valve 130. Alternatively, a spring washer, an O-ring and other elements may be employed provided that they are similar in function to the spring 132.

Figure 29A:
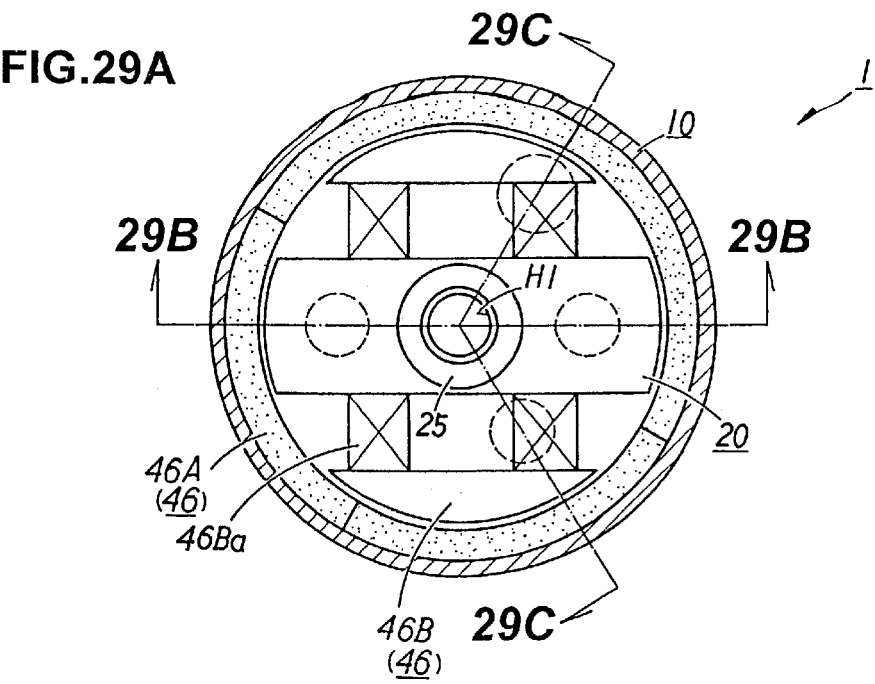
FIG. 29A is a sectional view taken on the line 29A—29A in FIG. 29B.
Figure 29B:
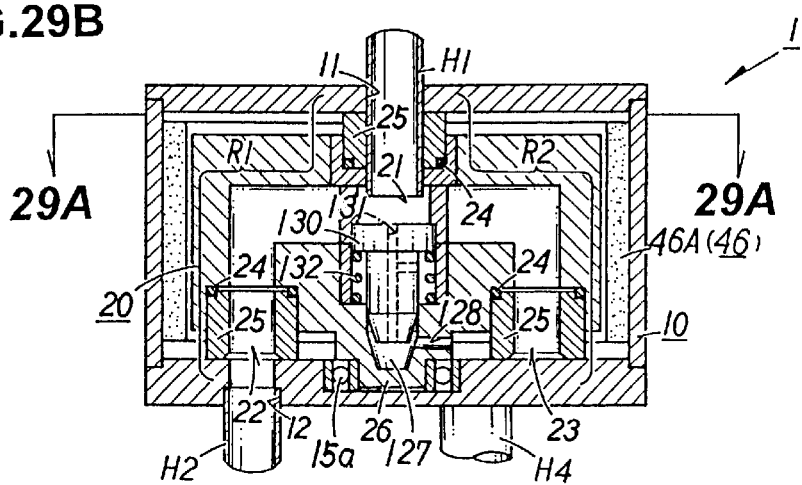
FIG. 29B is a sectional view taken on the line 29B—29B in FIG. 29A.
Figure 29C:
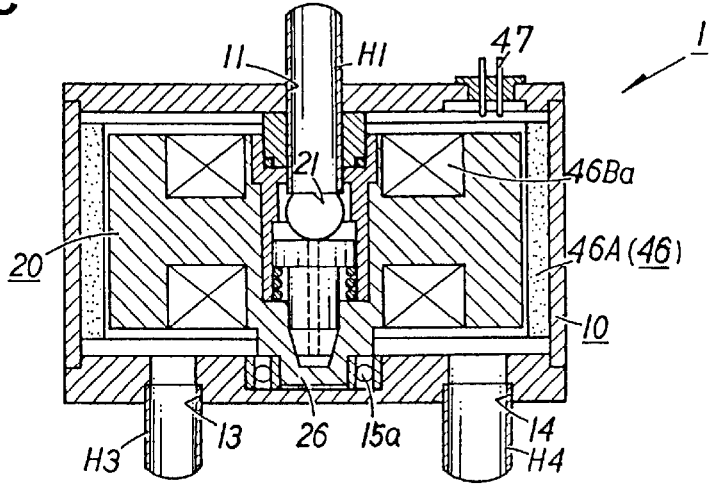
FIG. 29C is a sectional view taken on the line 29C—29C in FIG. 29A.

Reference will next be made to the structure of the drive source and the drive mechanism 30. In this embodiment, a drive element 46 serves as the drive source and the drive mechanism. Illustratively, the drive element 46 includes permanent magnets 46A and electromagnets 46B and substantially acts as a motor. Referring specifically to FIGS. 28A and 29A, the permanent magnets 46A with different polarity, south and north poles, are attached to the inner peripheral surface of the casing 10. The electromagnets 46B include coils 46Ba vertically wound around T-shaped cores and arranged at opposite sides of the valve body 20. In this arrangement, a lower bearing 15a is disposed centrally in the lower surface of the casing 10 as shown in FIGS. 29B and 29C.

Electric power is supplied to the coils 46Ba of the electromagnets 46B through power terminals 47 so as to rotate the valve body 20. The cores and the valve body 20 may be formed in an integral fashion. The discrete cores may be secured to the valve body 20 by a suitable securing means. Although not shown, stoppers are preferably arranged in the casing 10 to limit the angle of rotation of the valve body 20.

The operation of this embodiment, particularly the pressure absorbing mechanism, will now be described with reference to FIGS. 28A to 32D. For purposes of explanation, the device is initially in the heating mode of operation, and finally in the cooling/dehumidifying mode of operation after its operation is stopped once.

(1) Heating Mode

Figure 30A:
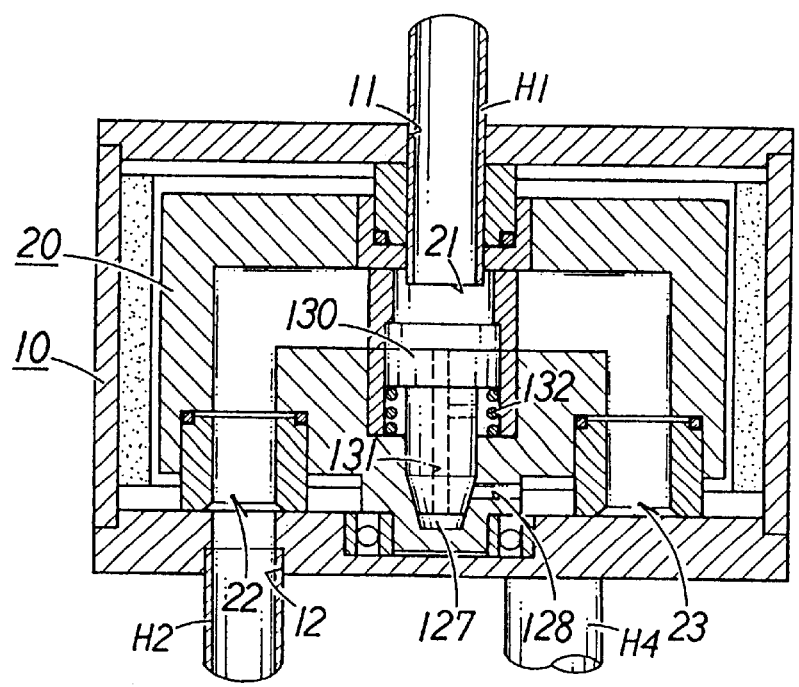
FIG. 30A is a sectional view of a pressure absorbing valve during heating and cooling/dehumidifying operations.

In the heating mode of operation, the second selectively positionable opening 22 of the valve body 20 is connected to the second pipe H2, and the third selectively positionable opening 23 is kept out of communication with the third pipe H3 as shown in FIG. 3. As shown in FIG. 30A, a gaseous refrigerant under high pressure is fed from the compressor 2 to urge the pressure absorbing valve 130 into its lower position. At this time, the spring 132 is placed in a compressed state. More specifically, the gaseous refrigerant under high pressure flows through the pressure control hole 131 and is, then, introduced into the space defined in the lower end of the valve chamber 127 or around the spring 132. A small upward force is also exerted on the pressure absorbing valve 130. However, since the downward force produced by the gaseous refrigerant under high pressure is greater than the upward force, the pressure absorbing valve 130 is moved in a downward direction. At this time, the taper end 130a of the pressure absorbing valve 130 is brought into close contact with the contact face 127a of the valve chamber 127 to close the bore 128. Accordingly, the gaseous refrigerant under high pressure will in no way flow out of the bore 128. The first flow passageway is under high pressure as it is connected to the outlet port of the compressor 2, whereas the interior of the casing is under low pressure as it is connected to the inlet port of the compressor 2. In this embodiment, the pressure absorbing valve 130 is urged directly by the gaseous refrigerant under high pressure. Alternatively, a bellows (diaphragm) or the like may be disposed in the upper end of the pressure absorbing valve 130 to indirectly urge the pressure absorbing valve 130.

(2) Stopping of Heating Mode

Figure 30B:
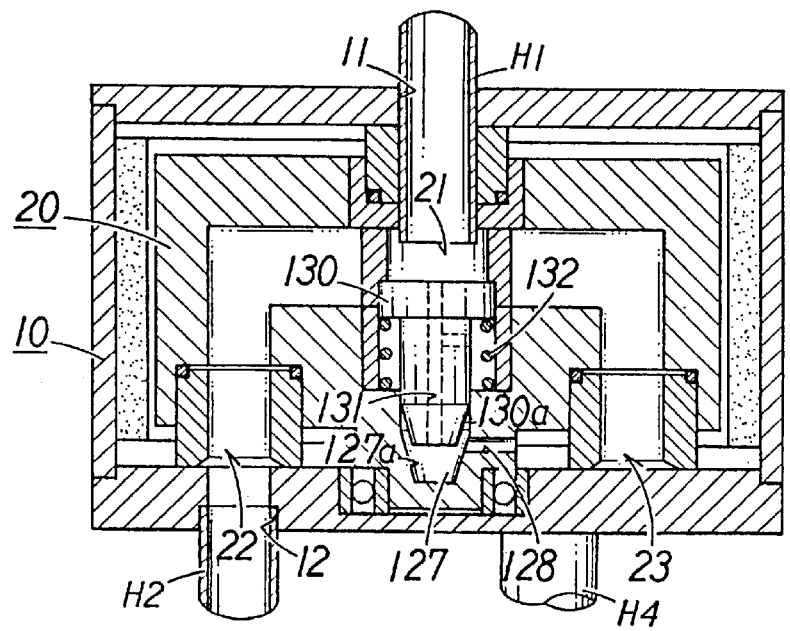
FIG. 30B is a view similar to that of FIG. 30A, but showing the pressure absorbing valve when the operation is stopped.

When the heating mode of operation is stopped, the gaseous refrigerant under high pressure is no longer fed from the compressor 2. The pressure absorbing valve 130 is then caused to project upwardly from the upper surface of the rotary valve under the bias of the spring 132 as shown in FIG. 30B. The tapered end 130a of the pressure absorbing valve 130 is no longer maintained in close contact with the contact face 127a of the valve chamber 127 and permits the bore 128 to be opened. The pressure absorbing valve 130 is now opened to allow the first selectively positionable opening 21 to be communicated with the remaining space in the casing 10 through the pressure control hole 131, the valve chamber 127 and the bore 128 so as to gradually eliminate differential pressure within the casing 10. It will take approximately one minute until the differential pressure is eliminated. A timer or the like may be employed to initiate the cooling or other mode.

(3) Cooling/Dehumidifying Mode

To change from the heating mode to the cooling/dehumidifying mode, the valve body 20 is rotated to allow the third selectively positionable opening 23 to be connected to the third pipe H3 while the second selectively positionable opening 22 is maintained out of communication with the second pipe H2 as shown in FIG. 4. This change takes place while differential pressure within the casing 10 is being reduced. As such, the device 1 is less subjected to loads, and the valve body 20 is smoothly rotated. The operation of the pressure absorbing valve 130 within the valve body 20 in this mode is similar to that in the heating mode of operation and will not be described herein.

The embodiment shown in FIGS. 28A to 32D can reduce differences in pressure and temperature within the casing 10 in a short period of time when a change in the mode of operation takes place. Since there is no abrupt change in the pressure and temperature, the casing 10, the valve body 20 and other components are less subjected to loads, thereby improving the durability of the device 1 per se. The pressure absorbing valve 130 is held in its open state unless pressure is exerted thereon. The pressure absorbing valve 130, when pressure is exerted, is lowered to close the bore 128 so as to prevent leakage of a gaseous refrigerant under high pressure. When no pressure is exerted, the pressure absorbing valve 130 is moved to its raised position to reduce differential pressure in a short period of time.

Figure 31A:
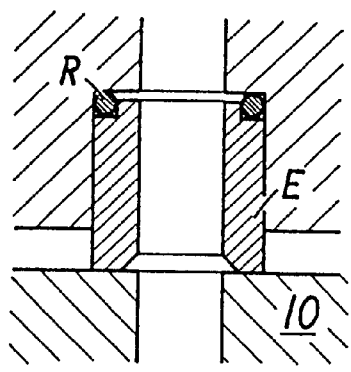
FIGS. 31A to 31F are vertical sectional views showing various sealing elements disposed in first, second and third selectively positionable openings.
Figure 31B:
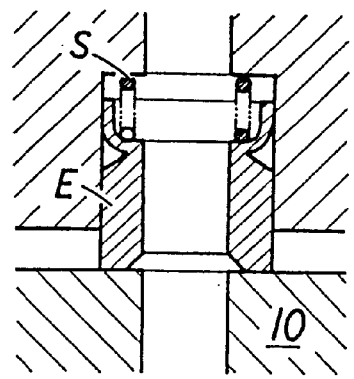
Figure 31C:
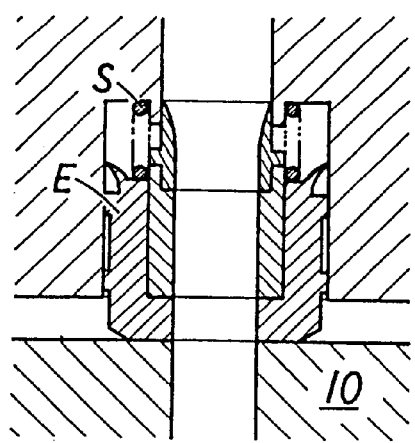
Figure 31D:
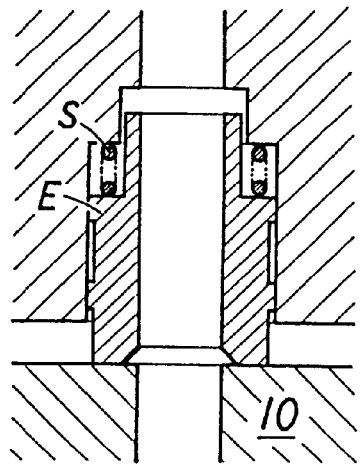
Figure 31E:
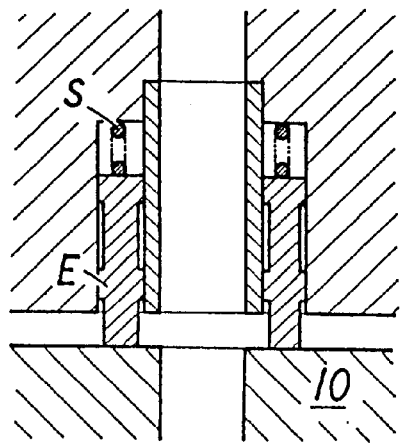
Figure 31F:
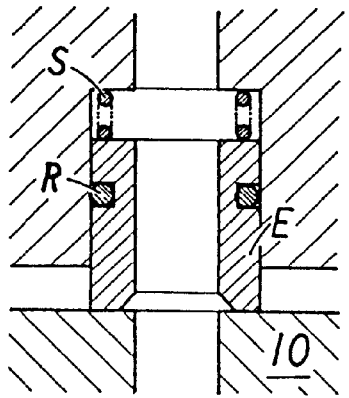
Figure 32A:
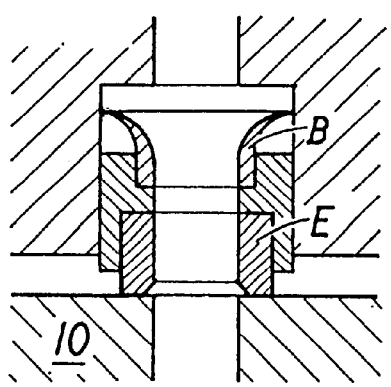
FIG. 32A to 32D are vertical sectional views showing various other sealing elements.
Figure 32B:
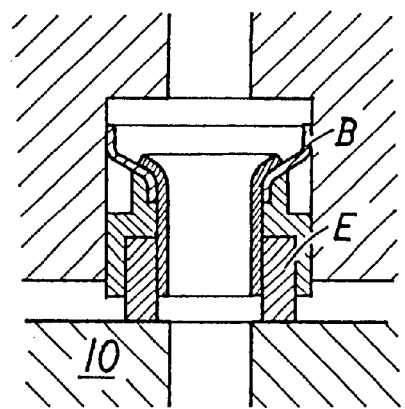
Figure 32C:
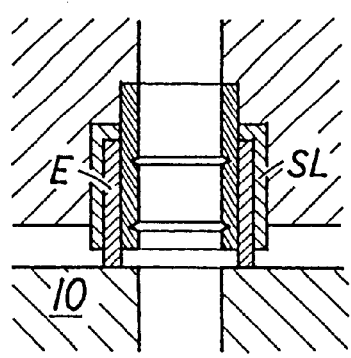
Figure 32D:
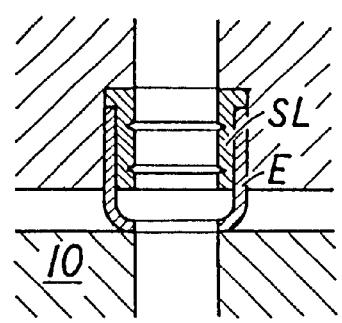

The present invention is intended to prevent leakage of an operating medium to achieve a high rate of heat exchange. To this end, various seals are disposed in the first selectively positionable opening 21, the second selectively positionable opening 22 and the third selectively positionable opening 23. Some of other seals will briefly be described with reference to FIGS. 31A to 32D. Referring to FIG. 31A, the resilience of an O-ring R may be utilized so as to urge a sealing element E against the inner peripheral surface of the casing 10. Referring to FIGS. 31B to 31E, the O-ring R may be replaced by a spring S. As shown in FIG. 31F, there may be employed a combination of the O-ring R and the spring S. Referring to FIGS. 32A and 32B, a tubular member may be inserted into each selectively positionable opening. The tubular member may have a lip B configured to receive pressure of an operating medium so as to urge the sealing element E. As shown in FIGS. 32C and 32D, a sleeve SL may be fit around or within the sealing element E.

SIXTH EMBODIMENT

Reference will now be made to the embodiment shown in FIGS. 33A to 33E. This embodiment is basically similar in structure to that shown in FIGS. 1A to 9, but differs therefrom in the following aspects. In the foregoing embodiments, the valve body 20 is located in the upper portion of the device, and the drive source is located below the drive mechanism 30 (except for the embodiment shown in FIGS. 28A to 32D wherein the drive source is located around the valve body 20). In this embodiment, the drive source, not shown, is located at the top of the device, and the valve body 20 is located below the drive mechanism 30.

Figure 33A:
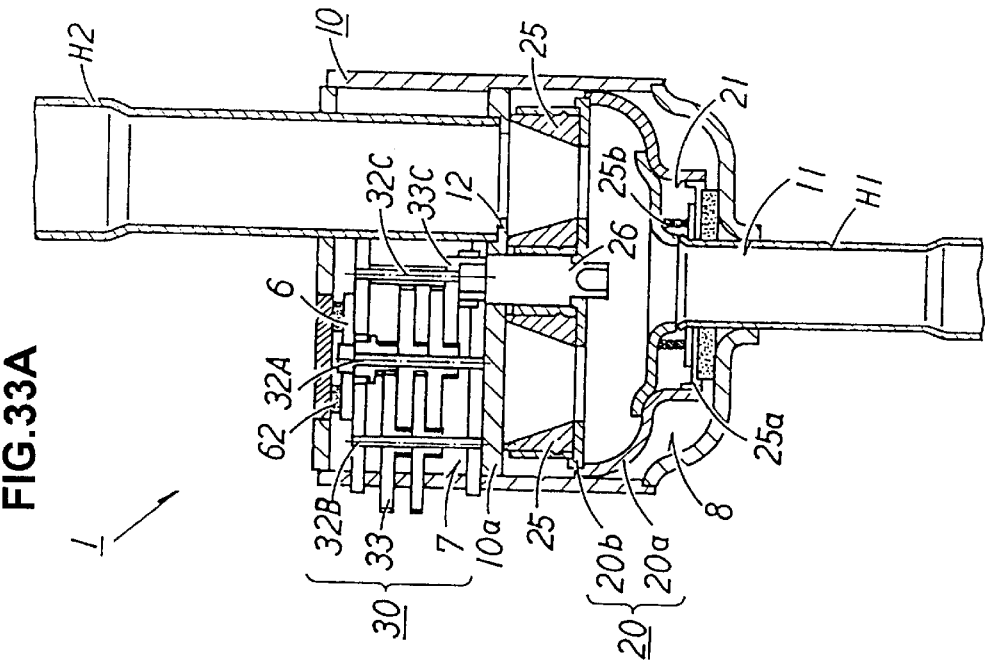
FIG. 33A is a vertical sectional view of a sixth embodiment.
Figure 33B:
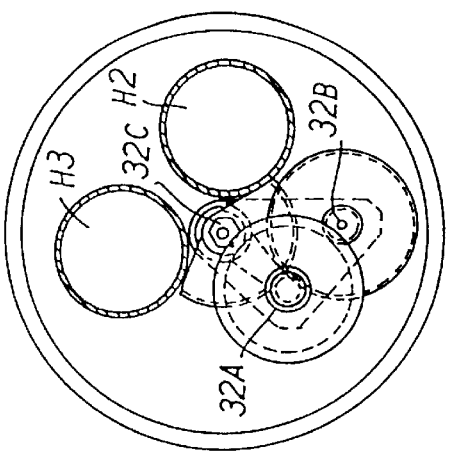
FIG. 33B is a plan view of the sixth embodiment.
Figure 33C:
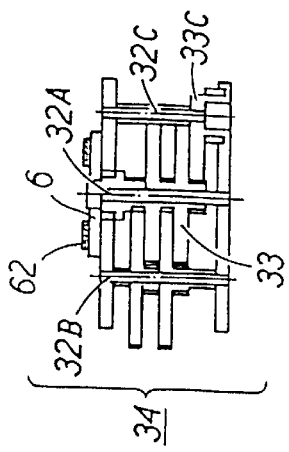
FIG. 33C is a sectional view of a speed reduction mechanism with a sectorial gear.
Figure 33D:
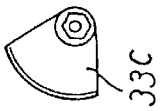
FIG. 33D is a plan view of a transmission mechanism.
Figure 33E:
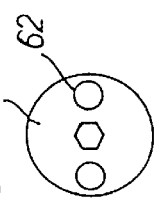
FIG. 33E is a bottom view of the sectorial gear.

Referring specifically to FIG. 33A, the second pipe H2 extends upwardly from the top of the casing 10 near the peripheral edge of the casing 10. The first pipe H1 extends downwardly from the center of the bottom of the casing 10. The third pipe H3 extends from the top of the casing 10, and the fourth pipe H4 (not shown) extends from the top or side of the casing 10. The drive source or motor M (not shown) extends along the second pipe H2 or the third pipe 3 and is offset from the center of the casing 10 to avoid interference with the second pipe H2 or the third pipe H3.

The arrangement of the speed reduction mechanism 31 and the gear train 34 in this embodiment is also different from that in the foregoing embodiments. Specifically, the shaft 32 is comprised of three shafts, an input shaft 32A, an intermediate shaft 32B and an output shaft 32C. The use of the intermediate shaft 32B is to avoid interference with the second pipe H2 or the third pipe H3. Rotary power from the motor M is transmitted through the transmission mechanism 6 to a first gear 33 of a small diameter which is loosely fit around the input shaft 32A. The rotary power is then transmitted to the intermediate shaft 32B and the second and subsequent gears which are loosely fit around the input shaft 32A. The rotary power is thereafter transmitted to the lowest gear 33 which is loosely fit around the output shaft 32C. In this embodiment, the rotary shaft needs to be rotated only by eighty degrees. The lowest gear 33 is a sectorial gear 33C which may, of course, be employed in the other embodiments.

Figure 34A:
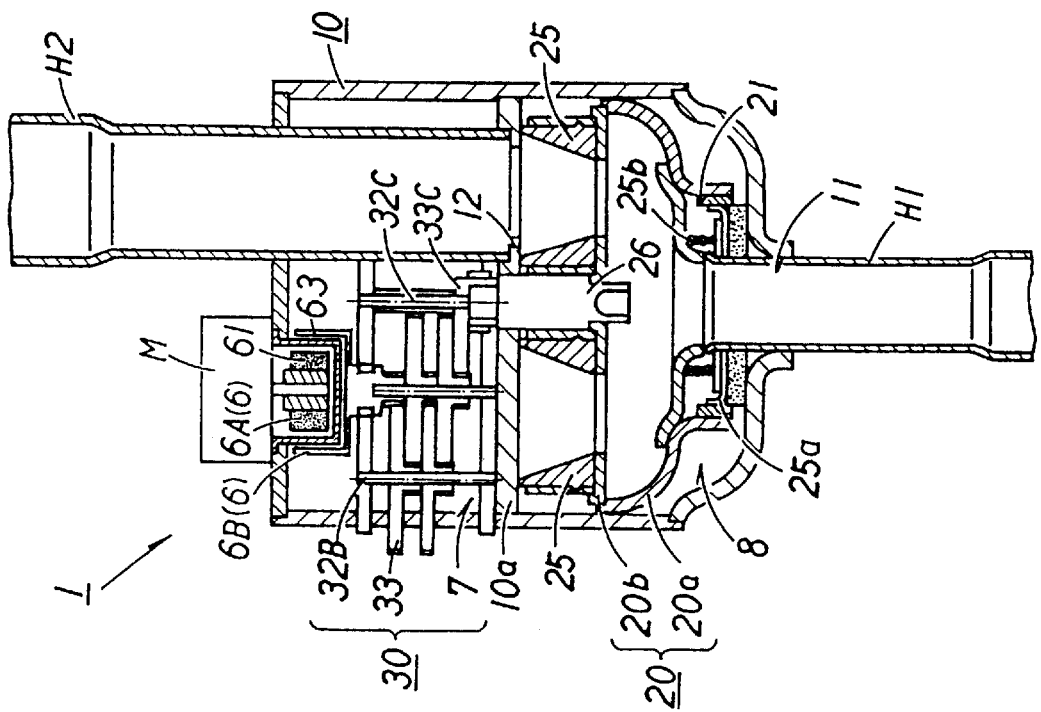
FIG. 34A is a vertical sectional view of the sixth embodiment wherein a transmission mechanism includes a steel plate acting as part of drive and driven elements.
Figure 34B:
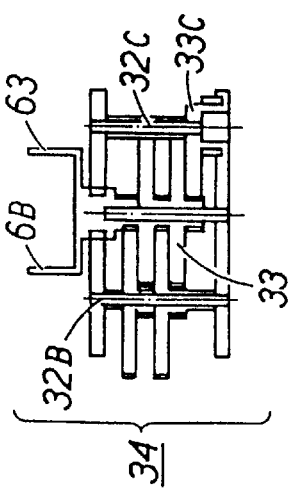
FIG. 34B is a sectional view of a speed reduction mechanism.
Figure 34C:
FIG. 34C is a bottom view of a sectorial gear.

In the embodiment shown in FIGS. 33A to 33E, the structure of the transmission mechanism 6 is such that permanent magnets 62 are arranged on a top end surface of the input shaft 32A in the same manner as that of the embodiment shown in FIGS. 2A to 2C so as to be driven in a non-contact state. However, the transmission mechanism 6 is not limited to having such a structure. Instead, it may be, for example, formed to have one element 6A or 6B thereof fitted around the other element 6B or 6A thereof as shown in FIGS. 34A to 34C, similar to the structure shown in FIG. 7 or 8 described above. In addition, either the drive element 6A or the driven element 6B may be made of a magnetic material, such as a steel plate or the like, instead of a permanent magnet. In the illustrated embodiment shown in FIGS. 34A to 34C, the driven element 6B is made of a steel plate 63.

Rotary power is finally transmitted from the rotary shaft 26 to the valve body 20 to switch the second port 12 or the third port 13. The valve body 20 in this embodiment has a profile such that the valve body 20 in the foregoing embodiments is turned upside down.

SEVENTH EMBODIMENT

Reference will be made to the embodiment shown in FIGS. 35A to 35D. This embodiment is basically similar in structure to the sixth embodiment, wherein the drive source and the valve body 20 are located in the upper portion and lower portion of the device, respectively, while the drive mechanism 30 is interposed therebetween, but differs therefrom in the following aspects. In this embodiment, a seal structure between the valve body 20 and the partition 10*a* and an airtight structure for each of the second pipe H2 to the fourth pipe H4 are constructed to exhibit positive properties thereof.

Now, the seal structure between the valve body 20 and the partition 10*a* will be described hereinafter. As the device for changing the flow of an operating medium is used in an air conditioning system, the device is initially assembled in the system, and generally, the system is then filled with a suitable operating medium, such as a fluorocarbon gas or the like, prior to initiating an operation of the air conditioning system, to thereby render the system ready to run. For the purpose of filling the system thoroughly with the operating medium, evacuation of all the pipings or passages into a vacuum is carried out prior to the filling of the system with the operating medium. Thereafter, during a working operation of the system, as the operating medium is circulated, the valve body 20 is subject to a high pressure, so that it is necessary to prevent the operating medium from leaking into the speed reduction chamber 7 and the like.

In this instance, if the seal structure between the valve body 20 and the partition 10*a* is relatively strong, the pipings or passages can be promptly rendered in a vacuum state in the evacuation operation, whereas the speed reduction chamber 7 is not rendered in a vacuum state. The speed reduction chamber 7 under a normal pressure seems as if it is present in an intermediate portion of the piping under vacuum, to permit the air to be leaked little by little through a connection section between the valve body 20 and the partition 10*a*, resulting in the vacuum environment of the pipings being slowly broken. That is, even if the seal structure is constructed to be very strong, a leakage per se with time can not be completely avoided. Therefore, in this embodiment, the seal structure between the valve body 20 and the partition 10*a* is not constructed to be very strong, instead, a check valve 27 is provided around the rotary shaft 26 for rotating the valve body 20 at a position where the rotary shaft 20 extends through the partition 10*a*. The check valve 27 is made of a suitable material, such as resin, metal, synthetic rubber, or the like and formed to have a cylindrical shape provided at an end thereof located on a near side of the speed reduction chamber 7 with a flared portion 27*a* like a bell mouth. The flared portion 27*a* is narrowed or loosened to limit the flow of the operating medium in a single direction. More specifically, as shown, in an enlarged scale, in FIG. 35C, during the evacuation operation, as the valve body 20 is subject to vacuum, the flared portion 27*a* of the check valve 27 is loosened or opened due to suction to thereby promptly evacuate the speed reduction chamber 7 into a vacuum. Thereafter, when the working operation of the air conditioning system is initiated, the valve body 20 is subject to a high pressure, to thereby narrow the flared portion 27*a* of the check valve 27, resulting in the flared portion 27*a* clinging to the partition 10*a*.

Next, the airtight structure for the second to fourth pipes H2 to H4 will be described hereinafter. The pipes H2 to H4 are each connected to the lateral side of the sealed casing 10 like those of the first embodiment shown in FIGS. 1A to 9. The airtight structure of the illustrated embodiment, as shown in FIGS. 35A and 35D, is constructed in such a manner that each of the pipes H2 to H4 is provided around an outer periphery thereof with an outer sheath Ha and an inner sheath Hb like an outer sleeve of a double layer. The outer sheaths Ha are each brazed to a corresponding one of the pipes H2 to H4 through the corresponding inner sheath Hb and to the casing 10 along the whole circumference thereof with a filler metal. Each of the inner sheaths Hb arranged within the corresponding outer sheath Ha is extended into the casing 10 and press fitted into the partition 10a made of a resin material. To ensure the press fitment of the inner sheath Hb, the inner sheath Hb is provided with a reinforcing pipe Hc of an inner hoop-shape which generates a radially outward force, resulting in the airtight structure of a high strength being obtained. That is, tightening of the partition 10a and the reinforcing pipe Hc, brazing of the outer and inner sheaths Ha and Hb to the respective pipes H2 to H4, brazing of the outer sheaths Ha to the sealed casing 10 and the like enhance the airtightness of each pipe in association with each other.

While the present invention has been described with respect to preferred embodiments thereof, it will be understood that numerous modifications may be made by those skilled in the art without departing from the scope of the invention. Accordingly, all modifications and equivalents may be resorted to which fall within the scope of the invention as claimed.

What is claimed is:

1. A device for changing the flow of an operating medium in an air conditioning system, comprising:
   a casing including a first port adapted to be connected to an outlet or inlet port of a compressor, said first port having an axis, a second port adapted to be connected to an indoor heat exchanger, a third port adapted to be connected to an outdoor heat exchanger, and a fourth port adapted to be connected to the inlet or outlet port of the compressor;
   a drive mechanism arranged in said casing and located on said axis of said first port; and
   a valve body rotatably supported by said drive mechanism and including a first flow passageway extending between a first selectively positionable opening and a second selectively positionable opening and a second flow passageway extending between said first selectively positionable opening and a third selectively positionable opening, said first port and said first selectively positionable opening being constantly kept in communication with one another, said valve body being reversibly rotated to a predetermined angle so as to selectively provide communication between said second port and said second selectively positionable opening and between said third port and said third selectively positionable opening to allow the operating medium to flow through said first flow passageway when said second port and said second selectively positionable opening are communicated with one another and to flow through said second flow passageway when said third port and said third selectively positionable opening are communicated with one another;
   said second selectively positionable opening and said third selectively positionable opening being located at opposite sides of said first selectively positionable opening and arranged in a diametrically opposed relationship.

2. A device for changing the flow of an operating medium in an air conditioning system, comprising:
   a casing including a first port adapted to be connected to an outlet or inlet port of a compressor, said first port having an axis, a second port adapted to be connected to an indoor heat exchanger, a third port adapted to be connected to an outdoor heat exchanger, and a fourth port adapted to be connected to the inlet or outlet port of the compressor;
   a drive mechanism arranged in said casing and located on said axis of said first port; and
   a valve body rotatable supported by said drive mechanism and including a first flow passageway extending between a first selectively positionable opening and a second selectively positionable opening and a second flow passageway extending between said first selectively positionable opening and a third selectively positionable opening, said first port and said first selectively positionable opening being constantly kept in communication with one another, said valve body being reversibly rotated to a predetermined angle so as to selectively provide communication between said second port and said second selectively positionable opening and between said third port and said third selectively positionable opening to allow the operating medium to flow through said first flow passageway when said second port and said second selectively positionable opening are communicated with one another and to flow through said second flow passageway when said third port and said third selectively positionable opening are communicated with one another;
   said second selectively positionable opening and said third selectively positionable opening being located at opposite sides of said first selectively positionable opening and arranged in a diametrically opposed relationship
   further comprising sealing elements disposed between said second port and said second selectively positionable opening and between said third port and said third selectively positionable opening, respectively, said sealing elements each having a given shape and structure, and
   a first effective pressure bearing area on which pressure is applied by the operating medium flowing through said first selectively positionable opening, and a second effective pressure bearing area on which pressure is applied by the operating medium flowing through said second selectively positionable opening and said third selectively positionable opening, said first effective pressure bearing area being set to be greater than said second effective pressure bearing area, whereby differential pressure resulting from a difference between said first effective pressure bearing area and said second effective pressure bearing area maintains sealing integrity of said sealing elements.

3. A device for changing the flow of an operating medium in an air conditioning system, comprising:
   a casing including a first port adapted to be connected to an outlet or inlet port of a compressor, said first port having an axis, a second port adapted to be connected to an indoor heat exchanger, a third port adapted to be connected to an outdoor heat exchanger, and a fourth port adapted to be connected to the inlet or outlet port of the compressor;

a drive mechanism arranged in said casing and located on said axis of said first port; and a valve body rotatable supported by said drive mechanism and including a first flow passageway extending between a first selectively positionable opening and a second selectively positionable opening and a second flow passageway extending between said first selectively positionable opening and a third selectively positionable opening, said first port and said first selectively positionable opening being constantly kept in communication with one another, said valve body being reversibly rotated to a predetermined angle so as to selectively provide communication between said second port and said second selectively positionable opening and between said third port and said third selectively positionable opening to allow the operating medium to flow through said first flow passageway when said second port and said second selectively positionable opening are communicated with one another and to flow through said second flow passageway when said third port and said third selectively positionable opening are communicated with one another;

said second selectively positionable opening and said third selectively positionable opening being located at opposite sides of said first selectively positionable opening and arranged in a diametrically opposed relationship wherein said drive mechanism includes a transmission mechanism having a drive element and a driven element which are kept out of contact with one another during transmission of rotary power from a drive source, said driven element being sealedly received in said casing, said drive element and said drive source being interconnected and placed outside of sealed part of the casing.

4. The device as defined in claim 2, wherein said drive mechanism includes a transmission mechanism having a drive element and a driven element which are kept out of contact with one another during transmission of rotary power from a drive source, said driven element being sealedly received in said casing, said drive element and said drive source being interconnected and placed outside of a sealed part of the casing.

5. A device for changing the flow of an operating medium in an air conditioning system, comprising:

a casing including a first port adapted to be connected to an outlet or inlet port of a compressor, said first port having an axis, a second port adapted to be connected to an indoor heat exchanger, a third port adapted to be connected to an outdoor heat exchanger, and a fourth port adapted to be connected to the inlet or outlet port of the compressor;

a drive mechanism arranged in said casing and located on said axis of said first port; and a valve body rotatable supported by said drive mechanism and including a first flow passageway extending between a first selectively positionable opening and a second selectively positionable opening and a second flow passageway extending between said first selectively positionable opening and a third selectively positionable opening, said first port and said first selectively positionable opening being constantly kept in communication with one another, said valve body being reversibly rotated to a predetermined angle so as to selectively provide communication between said second port and said second selectively positionable opening and between said third port and said third selectively positionable opening to allow the operating medium to flow through said first flow passageway when said second port and said second selectively positionable opening are communicated with one another and to flow through said second flow passageway when said third port and said third selectively positionable opening are communicated with one another;

said second selectively positionable opening and said third selectively positionable opening being located at opposite sides of said first selectively positionable opening and arranged in a diametrically opposed relationship further comprising a bellows seal disposed between said first port and said first selectively positionable opening.

6. The device as defined in claim 2, further comprising a bellows seal disposed between said first port and said first selectively positionable opening.

7. The device as defined in claim 3, further comprising a bellows seal disposed between said first port and said first selectively positionable opening.

8. The device as defined in claim 4, further comprising a bellows seal disposed between said first port and said first selectively positionable opening.

9. The device as defined in claim 5, wherein said bellows seal is shaped like an inverted cup.

10. The device as defined in claim 6, wherein said bellows seal is shaped like an inverted cup.

11. The device as defined in claim 7, wherein said bellows seal is shaped like an inverted cup.

12. The device as defined in claim 8, wherein said bellows seal is shaped like an inverted cup.

13. A device for changing the flow of an operating medium in an air conditioning system, comprising:

a casing including a first port adapted to be connected to an outlet or inlet port of a compressor, said first port having an axis, a second port adapted to be connected to an indoor heat exchanger, a third port adapted to be connected to an outdoor heat exchanger, and a fourth port adapted to be connected to the inlet or outlet port of the compressor;

a drive mechanism arranged in said casing and located on said axis of said first port;

a valve body rotatably supported by said drive mechanism and including a first flow passageway extending between a first selectively positionable opening and a second selectively positionable opening and a second flow passageway extending between said first selectively positionable opening and a third selectively positionable opening, said first port and said first selectively positionable opening being constantly kept in communication with one another, said valve body being reversibly rotated to a predetermined angle so as to selectively provide communication between said second port and said second selectively positionable opening and between said third port and said third selectively positionable opening to allow the operating medium to flow through said first flow passageway when said second port and said second selectively positionable opening are communicated with one another and to flow through said second flow passageway when said third port and said third selectively positionable opening are communicated with one another;

sealing elements disposed between said second port and said second selectively positionable opening and between said third port and said third selectively positionable opening, respectively, said sealing elements each having a given shape and structure; and a first effective pressure bearing area on which pressure is applied by the operating medium flowing through said first selectively positionable opening, and a second effective pressure bearing area on which pressure is applied by the operating medium flowing through said second selectively positionable opening and said third selectively positionable opening, said first effective pressure bearing area being set to be greater than said second effective pressure bearing area, whereby differential pressure resulting from a difference between said first effective pressure bearing area and said second effective pressure bearing area maintains sealing integrity of said sealing elements.

14. The device as defined in claim 13, wherein said drive mechanism includes a transmission mechanism having a drive element and a driven element which are kept out of contact with one another during transmission of rotary power from a drive source, said driven element being sealedly received in said casing, said drive element and said drive source being interconnected and placed outside of a sealed part of the casing.

15. The device as defined in claim 13, further comprising a bellows seal disposed between said first port and said first selectively positionable opening.

16. The device as defined in claim 14, further comprising a bellows seal disposed between said first port and said first selectively positionable opening.

17. The device as defined in claim 15, wherein said bellows seal is shaped like an inverted cup.

18. The device as defined in claim 16, wherein said bellows seal is shaped like an inverted cup.

19. A device for changing the flow of an operating medium in an air conditioning system, comprising:

a casing including a first port adapted to be connected to an outlet or inlet port of a compressor, said first port having an axis, a second port adapted to be connected to an indoor heat exchanger, a third port adapted to be connected to an outdoor heat exchanger, and a fourth port adapted to be connected to the inlet or outlet port of the compressor;

a drive mechanism arranged in said casing and located on said axis of said first port; and a valve body rotatably supported by said drive mechanism and including a first flow passageway extending between a first selectively positionable opening and a second selectively positionable opening and a second flow passageway extending between said first selectively positionable opening and a third selectively positionable opening, said first port and said first selectively positionable opening being constantly kept in communication with one another, said valve body being reversibly rotated to a predetermined angle so as to selectively provide communication between said second port and said second selectively positionable opening and between said third port and said third selectively positionable opening to allow the operating medium to flow through said first flow passageway when said second port and said second selectively positionable opening are communicated with one another and to flow through said second flow passageway when said third port and said third selectively positionable opening are communicated with one another;

said drive mechanism including a transmission mechanism having a drive element and a driven element which are kept out of contact with one another during transmission of rotary power from a drive source, said driven element being sealedly received in said casing, said drive element and said drive source being interconnected and placed outside of a sealed part of the casing.

20. The device as defined in claim 19, further comprising a bellows seal disposed between said first port and said first selectively positionable opening.

21. The device as defined in claim 20, wherein said bellows seal is shaped like an inverted cup.

* * * * *

UNITED STATES PATENT AND TRADEMARK OFFICE
CERTIFICATE OF CORRECTION

PATENT NO. : 6,234,207 B1  
DATED : May 22, 2001  
INVENTOR(S) : Isamu Toyama

Page 1 of 1

It is certified that error appears in the above-identified patent and that said Letters Patent is hereby corrected as shown below:

Column 12,
Line 2, "enhances" should read -- enhancing --.
Line 42, "16A" should read -- 15B --.

Column 13,
Line 7, cancel "ports).".
Line 13, "Φ" should read -- π --.

Column 16,
Line 30, "50" should read -- so --.

Column 21,
Line 2, "II2" (first occurrence) should read -- H2 --;
"II4" (first occurrence) should read -- H4 --;
"II2" (second occurrence) should read -- H2 --; and
"II4" (second occurrence) should read -- H4 --.

Signed and Sealed this

Twenty-second Day of January, 2002

Attest:

*Attesting Officer*

JAMES E. ROGAN
*Director of the United States Patent and Trademark Office*